United States Patent
Mortazavi et al.

(10) Patent No.: US 9,923,969 B2
(45) Date of Patent: Mar. 20, 2018

(54) LARGE-SCALE STORAGE AND RETRIEVAL OF DATA WITH WELL-BOUNDED LIFE

(71) Applicant: Futurewei Technologies, Inc., Plano, TX (US)

(72) Inventors: Masood Mortazavi, Santa Clara, CA (US); Chi Young Ku, San Ramon, CA (US); Stephen Morgan, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 296 days.

(21) Appl. No.: 14/818,925

(22) Filed: Aug. 5, 2015

(65) Prior Publication Data

US 2017/0041394 A1   Feb. 9, 2017

(51) Int. Cl.
  *H04L 29/08*   (2006.01)
  *G06F 3/06*    (2006.01)
  *H04L 12/24*   (2006.01)

(52) U.S. Cl.
  CPC ........ *H04L 67/1097* (2013.01); *G06F 3/0607* (2013.01); *G06F 3/067* (2013.01);
  (Continued)

(58) Field of Classification Search
  CPC ............. H04L 67/1097; H04L 41/0806; H04L 41/5051; H04L 67/1031; G06F 3/0607;
  (Continued)

(56) References Cited

U.S. PATENT DOCUMENTS 5,438,674 A * 8/1995 Keele .................... G06F 3/0601
                                                        703/23
7,734,153 B1 * 6/2010 Park ....................... G11B 20/10
                                                        386/241
(Continued)

FOREIGN PATENT DOCUMENTS

CN    103514177 A    1/2014
CN    104767745 A    7/2015

OTHER PUBLICATIONS

Partial English Machine Translation and Abstract of Chinese Patent Application No. CN103514177, Dec. 9, 2016, 6 pages.
(Continued)

*Primary Examiner* — Hamza Algibhah
*Assistant Examiner* — Hannah S Wang
(74) *Attorney, Agent, or Firm* — Conley Rose, P.C.

(57) ABSTRACT

A method comprising receiving one or more data storage specifications from a tenant, determining that a plurality of physical storage units in a physical storage system comprises a sufficient system capacity to provision data storage for the tenant, sending a storage request message to request creation of a network storage entity for the tenant according to the data storage specifications, and receiving a storage response message indicating a first of a plurality of logical storage units allocated to the network storage entity according to the data storage specifications, wherein the plurality of logical storage units are distributed across the plurality of physical storage units, and wherein the plurality of logical storage units are arranged in a sequential order to form a logical circular buffer.

8 Claims, 19 Drawing Sheets

(52) U.S. Cl.
CPC .......... *G06F 3/0631* (2013.01); *G06F 3/0656* (2013.01); *H04L 41/0806* (2013.01); *H04L 41/5051* (2013.01); *H04L 67/1031* (2013.01)

(58) Field of Classification Search
CPC ...... G06F 3/0631; G06F 3/0656; G06F 3/067; G06F 3/0619
USPC ....................................................... 709/223
See application file for complete search history.

(56) References Cited

U.S. PATENT DOCUMENTS

| | | |
|---|---|---|
| 7,779,056 B2 | 8/2010 | Lin |
| 2006/0153185 A1* | 7/2006 | Jain ......................... H04L 49/90 370/389 |

OTHER PUBLICATIONS

Partial English Machine Translation and Abstract of Chinese Patent Application No. CN104767745, Dec. 9, 2016, 3 pages.
Foreign Communication From A Counterpart Application, PCT Application No. PCT/CN2016/091774, International Search Report dated Oct. 20, 2016, 5 pages.
"Facebook Builds Exabyte Data Centers for Cold Storage," Data Center Knowledge, http://www.datacenterknowledge.com/archieves/2013/01/18/facebook-builds-new-data-centers-for-cold-storage, downloaded from the Internet Aug. 5, 2015, 4 pages.
"Glacier: Cold Cloud Storage from Amazon," Data Center Knowledge, http://www.datacenterknowledge.com/archieves/2012//amazon-glacier-cold-cloud-storage, downloaded from the Internet Aug. 5, 2015, 3 pages.

\* cited by examiner

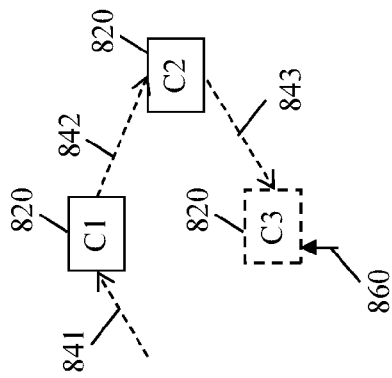
FIG. 8C
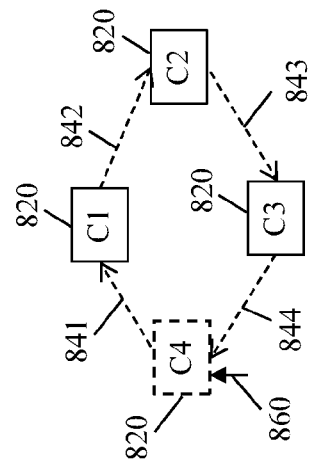
FIG. 8E
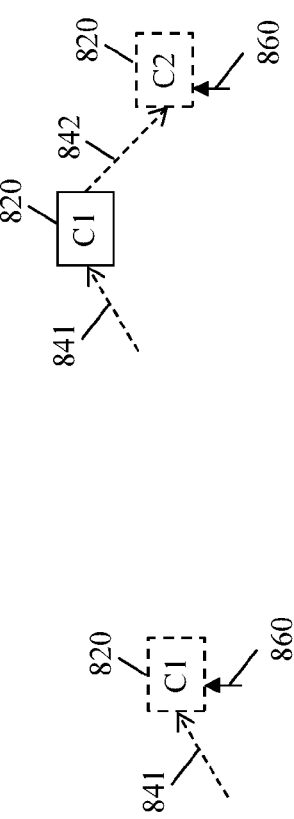
FIG. 8B
FIG. 8D
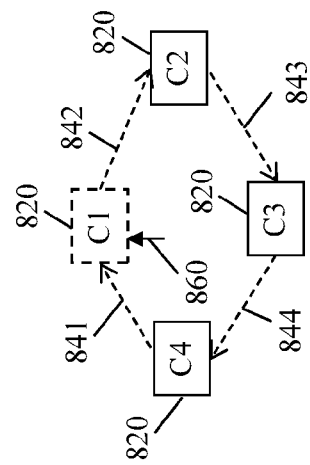
FIG. 8A

LARGE-SCALE STORAGE AND RETRIEVAL OF DATA WITH WELL-BOUNDED LIFE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The growth of the internet of things (IoT) is expected to result in a drastic increase in the amount of data available to describe the world. Some examples of data generated by IoT devices may include sensor data collected from IoT devices, videos and/or images collected from video monitoring systems, and other monitoring and/or performance data collected from data centers (DCs), mobile networks, and/or mobile terminals. As the amount of data increases, users seek to preserve and/or protect the data with backups and replications, driving the demand for storage even higher. However, much of the data generated by IoT devices grows cold quickly. Users are typically most interested in recent data and significantly less interested in older data. Thus, some of the challenges in designing a large-scale storage system besides storage technologies may include efficient, scalable, and flexible storage system architectures.

SUMMARY

In one embodiment, the disclosure includes a method comprising receiving one or more data storage specifications from a tenant, determining that a plurality of physical storage units in a physical storage system comprises a sufficient system capacity to provision data storage for the tenant, sending a storage request message to request creation of a network storage entity for the tenant according to the data storage specifications, and receiving a storage response message indicating a first of a plurality of logical storage units allocated to the network storage entity according to the data storage specifications, wherein the plurality of logical storage units are distributed across the plurality of physical storage units, and wherein the plurality of logical storage units are arranged in a sequential order to form a logical circular buffer.

In another embodiment, the disclosure includes an apparatus comprising a receiver configured to receive a storage request message requesting to create a network storage entity for a tenant, a processor coupled to the receiver and configured to compose the network storage entity according to the storage request message by allocating a plurality of logical storage units mapped to a plurality of physical storage units in a physical storage system according to a storage metric, arranging the logical storage units sequentially to form a logical circular buffer, and generating a metadata to associate the network storage entity, the logical circular buffer, and the logical storage units, wherein the metadata comprises a mapping between the logical storage units and the physical storage units and a sequential relationship between the logical storage units, and a transmitter coupled to the processor and configured to send a storage record message comprising at least a portion of the metadata to a network element (NE) instructing the NE to store data to the network storage entity according to the sequential relationship between the logical storage units and the mapping between the logical storage units and the physical storage units.

In yet another embodiment, the disclosure includes an apparatus comprising a receiver configured to receive a data record from a tenant, a memory configured to store a storage record for a network storage entity that is assigned to the tenant, wherein the storage record indicates a logical circular buffer formed from a sequence of logical storage units mapped to a plurality of physical storage units in a physical storage system, and store a current write location of the logical circular buffer, wherein the current write location corresponds to a location at a first of the logical storage units, a processor coupled to the receiver and the memory, wherein the processor is configured to determine that the current write location corresponds to a physical location at a first of the physical storage units mapped by the logical storage unit, and determine an NE associated with the first physical storage unit, and a transmitter coupled to the processor and configured to send a data storage message to the NE instructing the NE to write the data record to the first physical storage unit according to the physical location.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 8A illustrates an embodiment of an initial allocation and buffering scenario.

FIG. 8B illustrates an embodiment of a subsequent allocation and buffering scenario.

FIG. 8C illustrates another embodiment of a subsequent allocation and buffering scenario.

FIG. 8D illustrates another embodiment of a completed allocation and buffering scenario.

FIG. 8E illustrates an embodiment of a buffering scenario in a network storage entity comprising a complete logical circular buffer.

DETAILED DESCRIPTION

Figure 1:
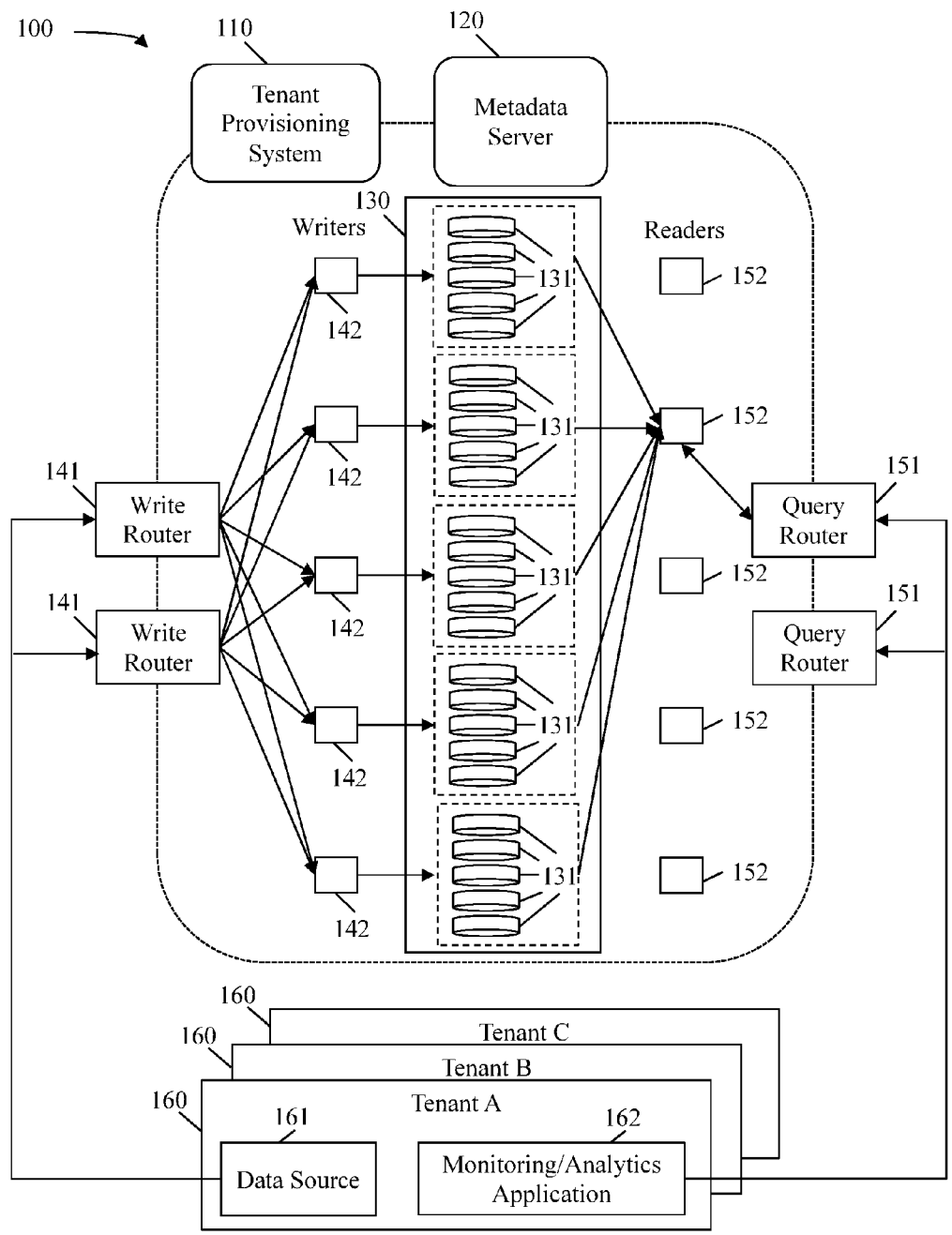
FIG. 1 is a schematic diagram of an embodiment of a storage network.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments for providing a large-scale multi-tenant storage system with read and write instrumentations for data with well-bounded life. Well-bounded life data refers to the data that comprises a known life span or a particular duration of interest. The disclosed embodiments decouple logical data storages from physical data storages by employing distributed circularly linked append-only buffer elements. The buffer elements are logical storage units distributed across a plurality of physical storage units in a physical storage system. Append-only refers to the writing of data continued from a previous write location. The circularly linked buffer elements form a logical circular buffer suitable for providing storages with a bounded duration by replacing oldest data with most recent data. In an embodiment, a large-scale multi-tenant storage system comprises a tenant provisioning system, a metadata server, a plurality of write routers, a plurality of query routers, a plurality of writers, and a plurality of readers. The tenant provisioning system is configured to receive storage requirements (e.g., data storage specifications) from a tenant, determine a storage capacity and a storage cost for the tenant, and request the metadata server to create a network storage entity for the tenant. The metadata server is configured to create a network storage entity for the tenant according to the request. For example, the metadata server composes a network storage entity by allocating a plurality of logical storage units (e.g., buffer elements) distributed across a plurality of physical storage units in a physical storage system and arranging the plurality of logical storage units sequentially to form a logical circular buffer. The metadata server generates metadata to associate the network storage entity, the logical circular buffer, the logical storage units, and the physical storage units. For example, the metadata server comprises a logical-to-physical mapping between the logical storage units and the physical storage units and a sequential relationship between the logical storage units that forms the logical circular buffer. The metadata server sends at least some portions of the metadata to the write routers to enable the write routers to route data to the network storage entity. The write routers are configured to coordinate with the writers to write data records to the physical storage system. The read routers are configured to coordinate with the readers to retrieve data records from the physical storage system upon data queries. Each physical storage unit may be written by a single writer, whereas each reader may access any physical storage units. In an embodiment, the metadata server performs buffer element allocations according to an objective function that minimizes input/output (IO) throughputs and/or IO heat across the physical storage units. In addition, the metadata server may relocate an open element of a particular logical circular buffer to a different physical storage unit over time to minimize IO throughputs and/or IO heat. The disclosed embodiments provide a set of application programming interfaces (APIs) for communicating with the storage system, for example, creation, deletion, and resizing of a network storage entity and data read from and/or write to a network storage entity.

FIG. 1 is a schematic diagram of an embodiment of a storage network 100. The network 100 comprises a tenant provisioning system 110, a metadata server 120, a storage system 130, a plurality of write routers 141, a plurality of writers 142, a plurality of query routers 151, and a plurality of readers 152 in data communications with each other. The tenant provisioning system 110, the metadata server 120, the storage system 130, the write routers 141, the writers 142, the query routers 151, and the readers 152 may correspond to components of a data storage system and may be provided by a data storage service provider. For example, the data storage service provider may provide network storages to a plurality of tenants 160 (e.g., tenant A, tenant B, and tenant C). Each tenant 160 may comprise a group of users that shares a common access with specific privileges to the network 100. Each tenant 160 may generate and/or capture data via a data source 161, request the data storage service provider to store the data, and query the stored data at a later time for monitoring and/or analysis via a monitoring and/or analytics application 162.

The data source 161 comprises any device configured to capture data and forward an associated bit-stream to the write routers 141. For example, the data source 161 may comprise a video and/or audio monitoring system, an IoT device comprising a sensor, a DC that captures data on system status/utilization, a mobile network that captures data on system status/utilization, etc. Accordingly, the bit-stream comprises data records that comprise any of a diverse array of data such as media (e.g. video and/or audio data), sensor data, and/or any other type of time series data that is substantially continuously monitored. The data records may also comprise other information associated with the data, such as temperature, current, device utilization, or any other attribute relevant to the data. In some embodiments, the data may comprise a bounded life. For example, the data may become less important or less interesting to a user over time.

The monitoring and/or analytics application 162 comprises one or more software components, which may be executed on a virtual machine (VM), a server machine, or any computing and/or processing devices. The monitoring and/or analytics application 162 may be configured to retrieve data and/or search for data for monitoring and analysis. For example, the monitoring and/or analytics application 162 may be interested in data that are within a particular range, captured during a particular time period, and/or comprises a particular data property.

The storage system 130 may be one or more devices suitable for storing data. As shown in FIG. 1, the storage system 130 comprises a plurality of physical storage units 131, which may include storage class memory (SCM), non-volatile memory (NVM), solid state drivers (SSDs), hard disk drives (HDDs), magnetic recordings, and/or shingled magnetic recordings (SMRs). The physical storage units 131 may be grouped into a plurality of storage groups (shown as dashed boxes). The storage system 130 is configured to receive a bit-stream from the data source 161 and store the received bit-stream, for example, as data segments via the write routers 141 and writers 142 and/or provide read access to the readers 152 to enable the readers 152 and the query routers 151 to retrieve stored data when requested by the monitoring and/or analytics application 162, as discussed more fully below. In some embodiments, the storage system 130 may additionally perform data compression to optimize storage usage.

The writers 142 may be any devices suitable for writing data to the storage system 130. The writers 142 may comprise processing units, memory, and/or IO interfaces to the storage system 130. Each physical storage unit 131 or each group of physical storage units 131 may be written by a single writer 142. The readers 152 may be any devices suitable for retrieving and/or reading data from the storage system 130. The readers 152 may comprise processing units, memory, and/or IO interfaces to the storage system 130. Each reader 152 may comprise read accesses to all the physical storage units 131 in the storage system 130.

The tenant provisioning system 110 may comprise one or more computing devices configured to receive data storage specifications from the tenants 160 and determine storage requirements and/or costs for the tenants 160 according to the data storage specifications. The data storage specifications may include data generation specifications and data query specifications. For example, a data generation specification may include information associated with data publishing frequency, duration of interest, a serialization scheme (e.g., data types and/or storage formats), and/or an indexing scheme. Thus, the tenant provisioning system 110 may determine a storage capacity, a write throughput requirement, and an ingress data flow and processing cost for a tenant 160 based on a tenant's 160 data generation specification. A data query specification may include information associated with data query frequency and/or complexity. Thus, the tenant provisioning system 110 may determine a read throughput requirement and an egress data flow and processing cost for a tenant 160 based on a tenant's 160 data query specification. The ingress processing cost and the egress processing cost may be referred to as a tenancy cost. In some embodiments, the provisioning may be pre-negotiated between the data storage service provider and the tenants 160. In some other embodiments, the provisioning may be dynamically negotiated between the data storage service provider and the tenants 160 and may be adjusted and/or updated over time. After storage requirements and/or costs are agreed between the tenant provisioning system 110 and a tenant 160, the tenant provisioning system 110 requests the metadata server 120 to create a network storage entity for the tenant 160 by allocating resources from the storage system 130 according to the tenant's 160 storage requirements. It should be noted that separate network storage entities may be created for the tenants 160 when supporting multi-tenancy. For example, each tenant 160 may be granted access only to the network storage entities created for the tenant 160.

The metadata server 120 is a virtual machine (VM), a server machine, or any device configured to manage the storage system 130. The metadata server 120 creates network storage entities for tenants 160 based on storage requirement information provided by the tenant provisioning system 110. The metadata server 120 employs a storage architecture that decouples the logical storage and the physical storage of data on the storage system 130. For example, the metadata server 120 defines logical storage units and maps the logical storage units to the physical storage units 131. The logical storage units may comprise the same size and/or different sizes. In an embodiment, the metadata server 120 may logically divide a physical storage unit 131 into multiple logical storage units. The metadata server 120 may further link several logical storage units depending on the amount of storages required by a tenant 160.

In an embodiment, the metadata server 120 assigns a plurality of logical storage units to a tenant 160 and presents the plurality of logical storage units to the tenant 160 as a single network storage entity by employing a circular linked list technique. For example, each network storage entity may be represented as a logical circular buffer formed from the sequence of logical storage units and data may be written sequentially into the sequence of logical storage units. Thus, a logical circular buffer comprises a single logical storage unit ready for data write at any given time instant. When a logical storage unit is full, the logical storage unit is sealed (e.g., not opened for storage) and data write may continue at a next logical storage unit in the sequence. The logical storage unit that is opened for storage or currently accepting data write is referred to as an open element. In some embodiments, the metadata server 120 may pre-allocate physical storages from the storage system 130 to logical storage units and form a logical circular buffer upon a network storage entity creation request. In some other embodiments, the metadata server 120 may build a network storage entity or a logical circular buffer for a tenant 160 by allocating physical storages to logical storage units as data records are received from the tenant's 160 data source 161. The building of the network storage entity or the logical circular buffer is complete when a sufficient amount of memory (e.g., according to the storage requirements) is allocated to the network storage entity. The mechanisms for building the logical circular buffer and writing data to the logical circular buffer and/or the storage system 130 are described more fully below.

The metadata server 120 tracks and maintains metadata associated with the network storage entity. For example, the metadata server 120 may generate a storage record or metadata for each network storage entity. The storage record may include global addresses of the physical storage units 131, a mapping between the logical storage units and the physical storage units 131, links and/or relationships (e.g., in the form of circular linked lists) between the logical storage units, and/or other storage related information, such as statuses, available capacities, IO performances, as discussed more fully below. The metadata server 120 may provide at least some portions of the storage records to the write routers 141 to enable the write routers 141 to route data records to corresponding physical storage units 131. In addition, the metadata server 120 may provide at least some portions of the storage records to the query routers 151 to enable the query routers 151 to retrieve data records from the storage system 130.

The write routers 141 may be routers, switches, or any devices configured to route data from the data source 161 to the storage system 130 via the writers 142. The write routers 141 cache the storage records provided by the metadata server 120. The write routers 141 maintain and track an open element in each logical circular buffer and a current write position in each open element. When a write router 141 receives a data record from a data source 161, the write router 141 determines a storage record associated with the data source 161 and/or the tenant 160 of the data source 161 and coordinates with the writers 142 and/or the metadata server 120 to write the data record to the storage system 130. For example, the write router 141 determines a physical storage unit 131 mapped by the open element and a physical address within an address range of the physical storage unit 131 corresponding to the current write position. The write router 141 determines a writer 142 associated with the physical storage unit 131 and routes the data record to the writer 142 instructing the writer 142 to write the data record to the physical storage unit 131 beginning at the physical address corresponding to the current write position. The write router 141 may additionally provide the writer 142 with a physical address corresponding to the open element so that the writer 142 may inform the write router 141 when the open element is full. When the open element is full, the write router 141 may look up a next logical storage unit for the network storage entity from the storage record and/or consult with the metadata server 142 to determine a next logical storage unit and route the remaining data record to a writer 142 corresponding to the physical storage unit 131 mapped to the next logical storage unit. The interactions between the write routers 141, the writers 142, and the metadata server 142 for data writes are discussed more fully below.

The query routers 151 may be routers, switches, or any devices configured to route data from the storage system 130 to the tenant's 160 monitoring and/or analytics application 162 via the readers 152. The query routers 151 cache the storage records provided by the metadata server 120. When a query router 151 receives a read request for a data record from a monitoring and/or analytics applications 162, the query router 151 retrieves a storage record associated with the data record. The query router 151 determines a logical storage unit associated with the data record and a physical storage unit 131 mapped by the logical storage unit according to the storage record. Subsequently, the query router 151 requests a reader 152 to retrieve the data record from the physical storage unit 131. Since each reader 152 comprises read accesses to all the physical storage units 131, the query router 151 may route the read request to any reader 152. In some embodiments, the query router 151 may determine a particular reader 152 based on loadings of the readers 152. It should be noted that the metadata server 120 is not invoked for each data write to and/or each data read from the storage system 130. Thus, IO throughputs may not be limited by the metadata server 120. In addition, the input loadings may be distributed across the write routers 141 and/or the output loadings may be distributed across the query routers 151. In addition, the network 100 may be configured as shown or alternatively configured as determined by a person of ordinary skill in the art to achieve similar functionalities.

Figure 2:
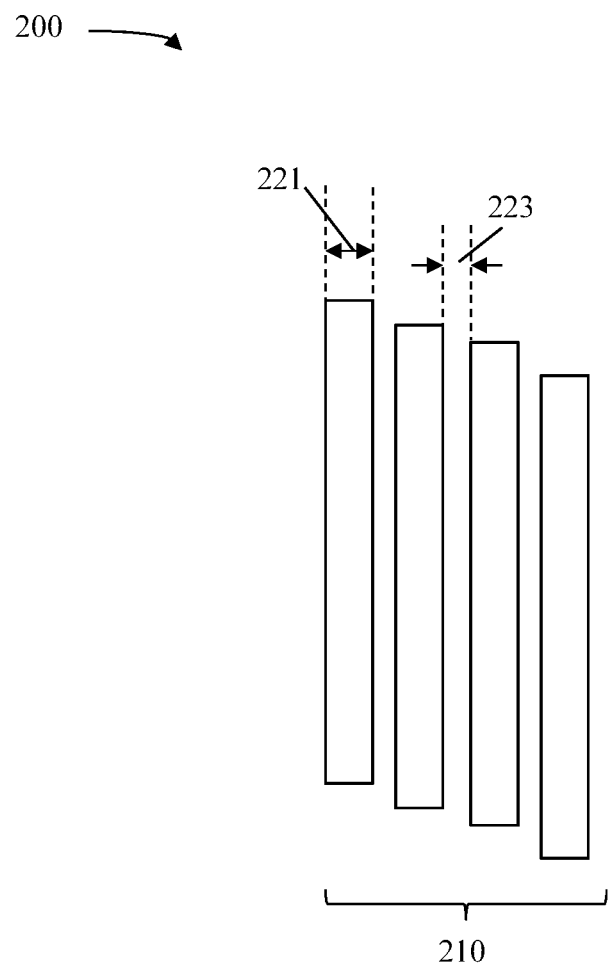
FIG. 2 is a schematic diagram of an embodiment of a general data storage scheme.

FIG. 2 is a schematic diagram of an embodiment of a general data storage scheme 200, which may be employed by a storage device, such as the storage system 130. In the scheme 200, data is stored in a plurality of data bands 210. Each data band 210 comprises a relatively large amount of data, for example 32-256 megabytes (MBs). As a specific example, when a data stream transmits sixty four bits of data at a frequency of one transmission per five seconds, approximately four weeks of the data stream can be stored in a 32 MB data band. The storage device comprises write heads for writing the received data to the memory and read heads for reading data from the memory. Each data band 210 comprises approximately the same written width 221 as the write head. For reasons associated with the hardware, data near the center of the write head comprises fewer errors than data at the edges of the write head. Accordingly, the read heads are smaller than the write heads and only read the center of each data band 210. Gaps 223 are positioned between each data band 210 to prevent adjacent data bands 210 from becoming corrupted during the writing process. The scheme 200 allows each data band 210 to be written, read, and overwritten independently. However, the existence of gaps 223 decreases the number of data bands 210 that fit in any specified area of the memory.

Figure 3:
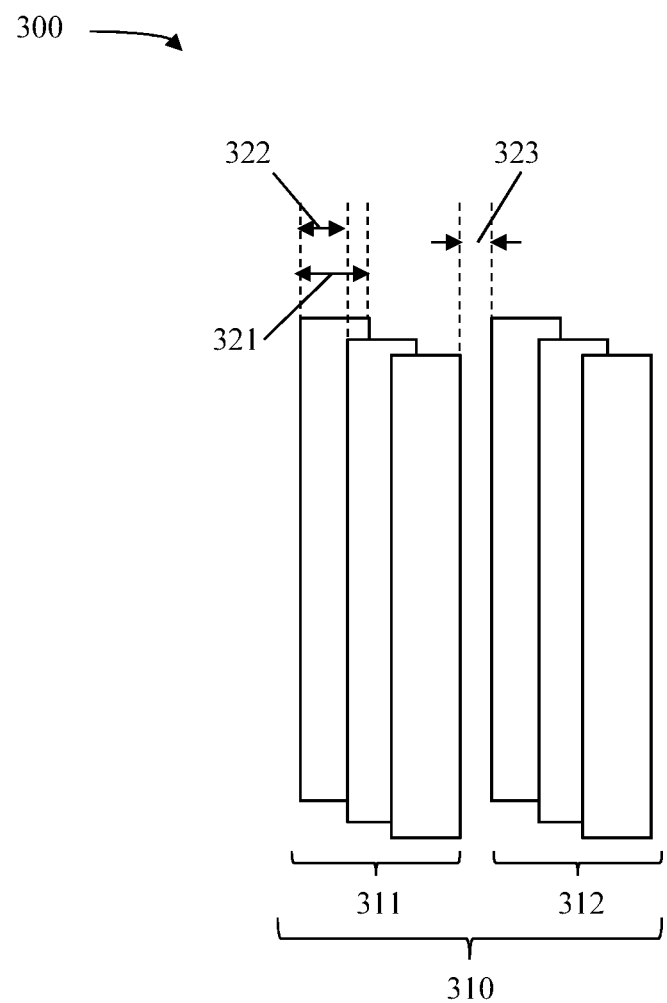
FIG. 3 is a schematic diagram of an embodiment of an append-only data storage scheme for cold data.

FIG. 3 is a schematic diagram of an embodiment of an append-only data storage scheme 300 for cold data, which may be employed by a storage device, such as the storage system 130. The scheme 300 employs data bands 310, which are similar to data bands 210. In contrast to the scheme 200, scheme 300 groups the data bands 310 together into groups 311 and 312 by eliminating some of the gaps 223 shown in scheme 200. While the scheme 300 depicts a first group 311 of the data bands 310 and a second group 312 of the data bands 310, any number of groups may be used. The first group 311 is separated from the second group 312 by a gap 323. The scheme 300 shingles the data bands 310 by causing each data band 310 in a group to overwrite a portion of a previous data band 310 in the group 311 or 312. While portions of the written width 321 of the data bands 310 are overwritten, a read width 322 for each data band 310 is maintained (e.g. not overwritten). Accordingly, the scheme 300 maximizes the number of data bands 310 that fit in a specified space by exploiting the difference in sizes between the read head and the write head. The operational costs associated with the scheme 300 are that overwriting any data band 310 will also overwrite/corrupt data in any subsequent data band 310. As such, the scheme 300 is an append-only scheme. New data bands 310 may be appended to the end of any group 311 or 312 without corrupting data so long as the gap 323 is maintained. Overwriting any written data band 310 also requires overwriting all subsequent data bands 310 in the associated group 311 or 312. As such, the scheme 300 is poorly suited for data requiring frequent updates, but is well suited for storage of large amounts of cold data that is rarely altered after storage. For example, the scheme 300 allows for optimal data band 310 storage space efficiency, which is beneficial for large amounts of data, without requiring a significant operational cost as cold data is rarely modified.

Figure 4:
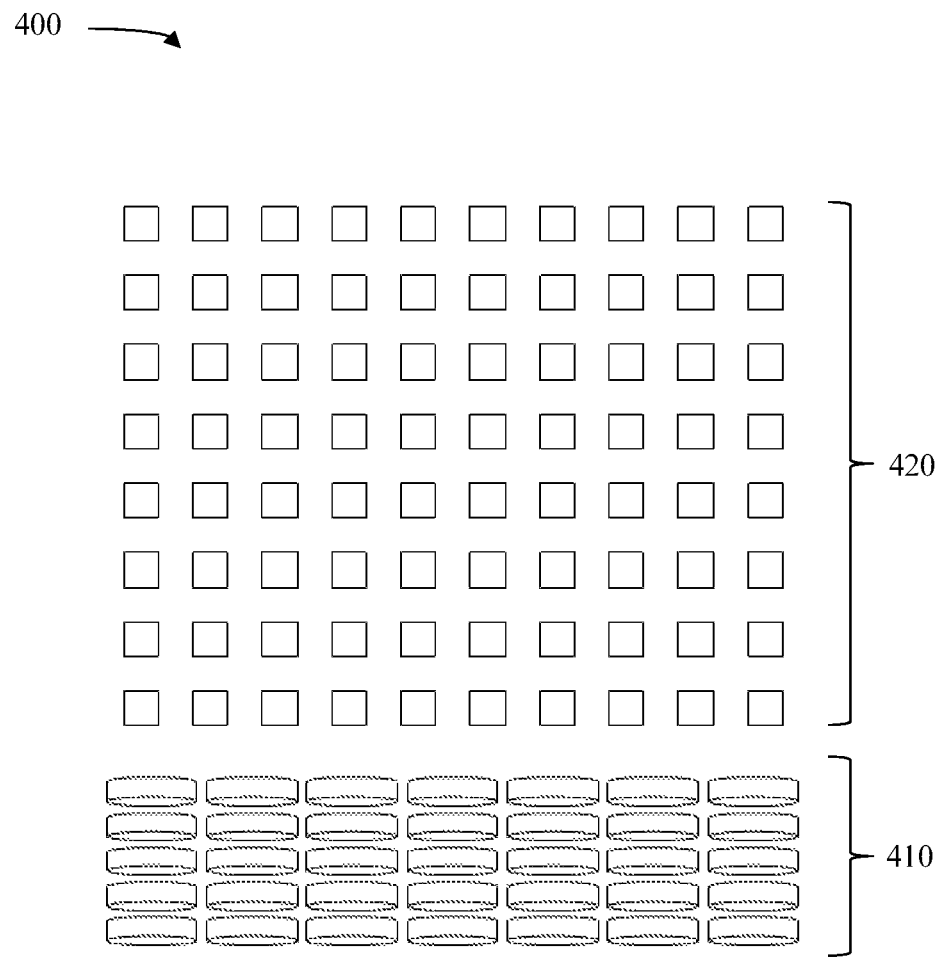
FIG. 4 is a schematic diagram of an embodiment of a storage architecture that decouples logical and physical storage of data.

FIG. 4 is a schematic diagram of an embodiment of a storage system 400 architecture that decouples logical and physical storage of data. The storage system 400 may be similar to the storage system 130. The system 400 comprises a plurality of physical storage units 410 similar to the physical storage units 131. The system 400 decouples the logical and the physical storage of data by defining a plurality of logical storage units 420 and mapping the logical storage units 420 to the physical storage units 410. Each logical storage unit 420 corresponds to a buffer element and may refer to the smallest unit of storage allocation in the system 400. In some embodiments, the logical storage units 420 are append-only buffers, where a data write may continue from a previous write location. The logical storage units 420 may be mapped to the physical storage units 410 by employing several mechanisms. For example, a single physical storage unit 410 may be logically split into multiple logical storage units 420. Alternatively, a single logical unit 420 may be mapped to a portion of one physical storage unit 410 and a portion of another physical storage unit 410. Each of the logical storage units 420 may comprise the same storage capacity or a different storage capacity. When a DC or a data storage server provider employs the system 400 architecture, a tenant, such as the tenant 160, is assigned with one or more logical storage units 420 distributed over the physical storage units 410. The logical storage units 420 may be logically linked together to form a circular buffer and may be represented as a single network storage entity, as described more fully below.

Figure 5:
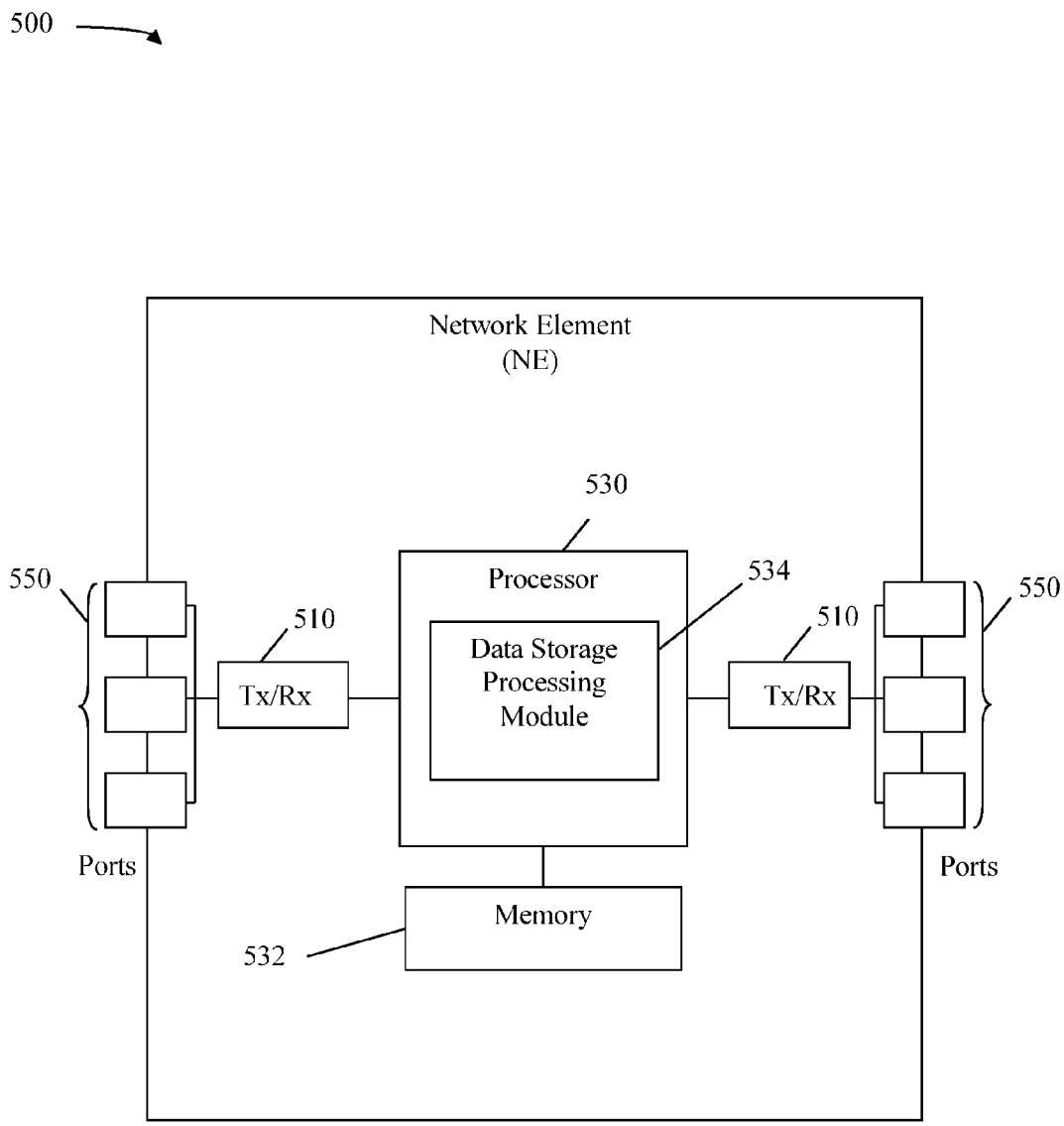
FIG. 5 is a schematic diagram of an embodiment of an NE configured to perform data storage.

FIG. 5 is a schematic diagram of an embodiment of an NE 500 acting as a node in a network, such as the network 100. For example, the NE 500 may be configured to act as a tenant provision system, such as the tenant provisioning system 110, a metadata server, such as the metadata server 120, a write router, such as the write routers 141, a writer, such as the writers 142, a query router, such as the query routers 151, and/or a reader, such as the readers 152. NE 500 may be implemented in a single node or the functionality of NE 500 may be implemented in a plurality of nodes in a network. One skilled in the art will recognize that the term NE encompasses a broad range of devices of which NE 500 is merely an example. NE 500 is included for purposes of clarity of discussion, but is in no way meant to limit the application of the present disclosure to a particular NE embodiment or class of NE embodiments. At least some of the features/methods described in the disclosure may be implemented in a network apparatus or component such as an NE 500. For instance, the features/methods in the disclosure may be implemented using hardware, firmware, and/or software installed to run on hardware. The NE 500 may be any device that processes, stores, and/or forwards data frames through a network, e.g., a server, a client, a data source, etc. As shown in FIG. 5, the NE 500 may comprise transceivers (Tx/Rx) 510, which may be transmitters, receivers, or combinations thereof. Tx/Rxs 510 may be coupled to a plurality of ports 550 (e.g. upstream interfaces and/or downstream interfaces) for transmitting and/or receiving frames from other nodes. A processor 530 may be coupled to the Tx/Rxs 510 to process the frames and/or determine which nodes to send frames to. The processor 530 may comprise one or more multi-core processors and/or memory devices 532, which may function as data stores, buffers, etc. Processor 530 may be implemented as a general processor or may be part of one or more application specific integrated circuits (ASICs) and/or digital signal processors (DSPs). Processor 530 may comprise a data storage processing module 534, which may perform the methods 1100, 1200, 1300, 1400, 1500, 1600, 1700, and 1800, depending on the embodiment. In an embodiment, the data storage processing module 534 estimates storage requirements and costs for tenants. In another embodiment, the data storage processing module 534 allocates network storages for tenants. In another embodiment, the data storage processing module 534 routes data records to storage devices and/or perform data writes. In yet another embodiment, the data storage processing module 534 retrieves data from the storage devices. In an alternative embodiment, the data storage processing module 534 may be implemented as instructions stored in memory device 532, which may be executed by processor 530, for example as a computer program product. In another alternative embodiment, the data storage processing module 534 may be implemented on separate NEs. The memory devices 532 may be configured to store metadata and/or storage records, which may be employed by the data storage processing module 534. The ports 550 may contain electrical and/or optical transmitting and/or receiving components.

It is understood that by programming and/or loading executable instructions onto the NE 500, at least one of the processor 530, the data storage processing module 534, ports 550, Tx/Rxs 510, and/or device memory 532 are changed, transforming the NE 500 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 6:
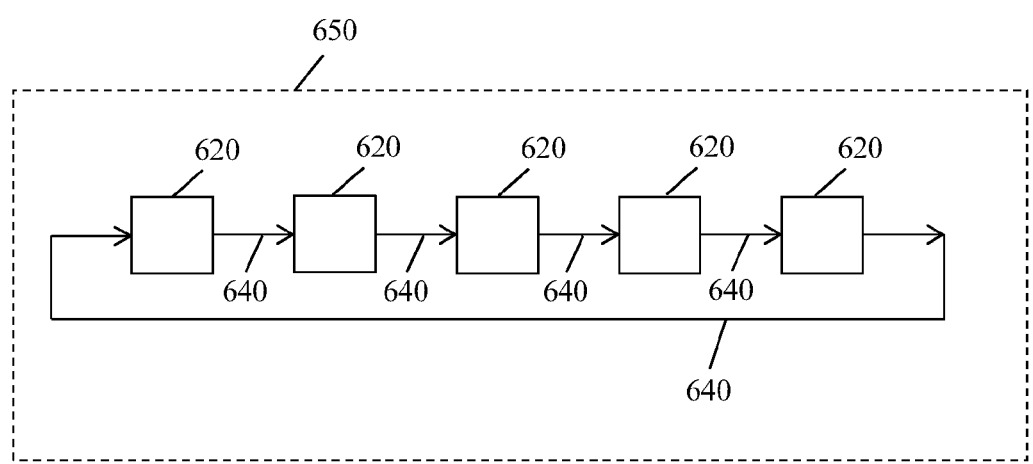
FIG. 6 is a schematic diagram of an embodiment of a network storage entity logical layout.

FIG. 6 is a schematic diagram of an embodiment of a network storage entity logical layout 600. The layout 600 may be employed by a metadata server, such as the metadata server 120, when creating a network storage entity for a tenant, such as the tenant 160. The layout 600 comprises a plurality of buffer elements 620, which may be similar to the logical storage units 420, arranged in an ordered sequence (e.g., a logical sequential relationship) and circularly linked to form a logical circular buffer 650. The buffer elements 620 are interconnected by links 640, which are logical links. The buffer elements 620 are unaware of the logical relationship. Instead, the logical relationship or representations of the links 640 are maintained separately by the metadata server. For example, the metadata server may employ a storage record to track the mapping between the buffer elements 620 and the physical locations of the buffer elements 620 in a given logical circular buffer 650. The buffer elements 620 are distributed across a plurality of physical storage units, such as the physical storage units 131 and 410, in a storage system, such as the storage system 130. In an embodiment, the logical circular buffer 650 or the network storage entity may be identified by a name. For example, the name may include a tenant identifier (ID) that identifies a particular tenant and/or a metric or data ID that identifies a particular type of data or metric that may employ the logical circular buffer 650 for storage and may be in the form of /TenantID/MetricID. The physical location of a particular buffer element 620 may be identified by a global address that includes the location of a storage device, a physical storage unit, a storage band, such as the data bands 210 and/or 310, a segment within the storage band, etc. and may be in the form of /Hub/Writer/DiskGrouping/Disk/Band/Segment. The physical location may be employed by a write router, such as the write routers 141, and a writer, such as the writers 142, when writing data to the network storage entity. The physical location may also be employed by a query router, such as the query routers 151, and a reader, such as the readers 152, when retrieving data from the network storage entity.

Figure 7:
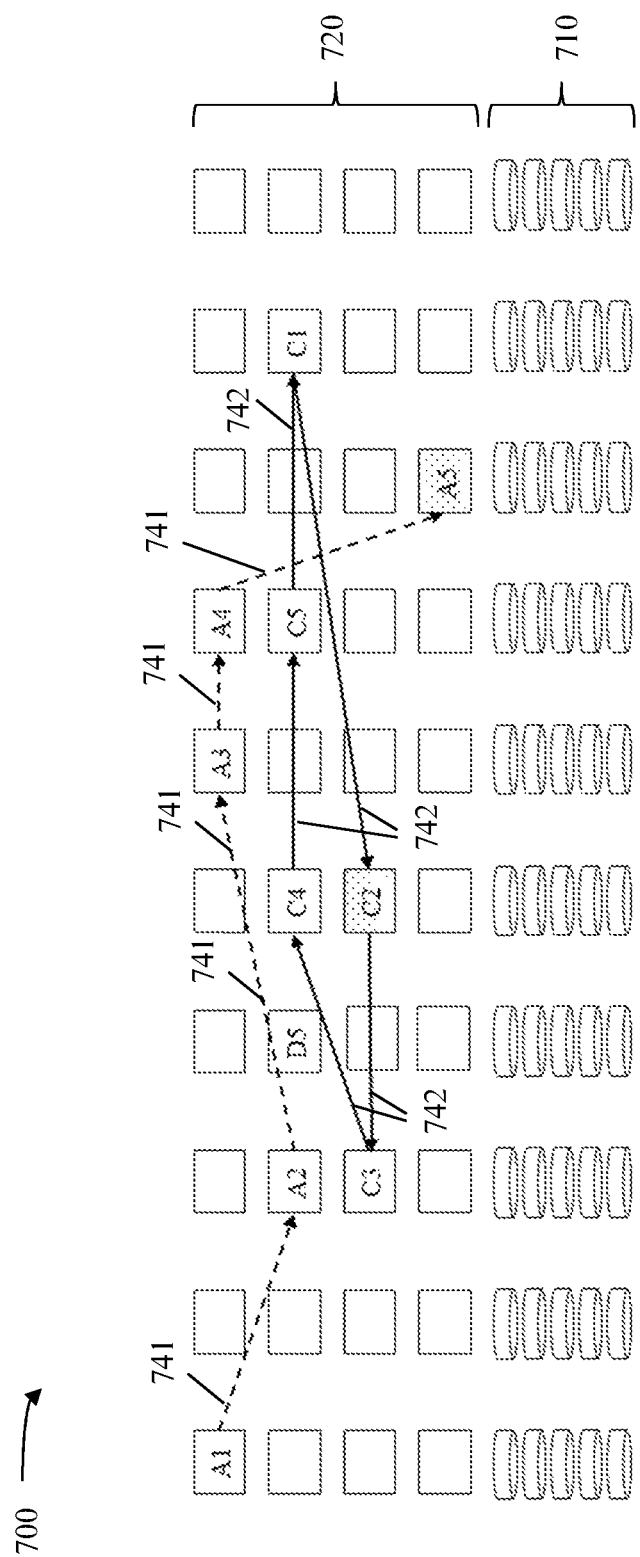
FIG. 7 is a schematic diagram of an embodiment of a distributed storage system.

FIG. 7 is a schematic diagram of an embodiment of a distributed storage system 700 layout. The system 700 may correspond to a portion of the storage system 130 and the system 400. The system 700 comprises a plurality of physical storage units 710 and a plurality of logical storage units 720 mapped to the physical storage units 710. The physical storage units 710 are similar to the physical storage units 131 and 410. The logical storage units 720 are similar to the logical storage units 420. The layout illustrates mappings between network storage entities, the logical storage units 720, and the physical storage units 710 at a given time instant, for example, after a metadata server, such as the metadata server 120, created a plurality of network storage entities from the system 700. As shown, the system 700 provisions for two network storage entities. A first network storage entity is allocated with a first plurality of the logical storage units 720 (e.g., A1, A2, A3, A4, and A5) distributed across the physical storage units 710 and the logical relationships between the logical storage units A1-A5 720 are represented by the dashed arrows 741. A second network storage entity comprises a second plurality of the logical storage units 720 (e.g., C1, C2, C3, C4, and C5) 720 and the logical relationships between the second logical storage units C1-C5 720 are represented by the solid arrows 742. The allocation for the second network storage entity is completed, thus the logical storage units C1-C5 720 forms a complete logical circular buffer, whereas the building of the first network storage entity is in progress. Thus, the logical storage units A1-A5 720 form an open loop instead of a closed circular loop. For example, the logical storage unit A5 720 may correspond to an open element, which is also a last allocated element, in the first network storage entity. After the logical storage unit A5 720 is full, the logical storage unit A5 720 may be sealed and a next logical storage unit 720 may be allocated from the physical storage units 710. The sequence of the logical storage units A1-A5 720 is referred to as an incomplete logical circular buffer.

FIGS. 8A-E illustrates an embodiment of a circular buffering scheme 800. The scheme 800 is implemented by a metadata server, such as the metadata server 120, and a write router, such as the write routers 141, in a storage network, such as the network 100. The scheme 800 is implemented when building up a network storage entity for a tenant, such as the tenant 160. For example, the network storage entity may be in the form of a logical circular buffer, such as the circular buffer 650. The scheme 800 may be applied to a storage system, such as the storage systems 130, 400, and 700, which may decouple logical storages from physical storages.

FIG. 8A illustrates an embodiment of an initial allocation and buffering scenario. For example, the metadata server allocates a first buffer element C1 820, similar to the buffer elements 620 and logical storage units 420 and 720, from the storage system and creates a logical circular buffer for the network storage entity. For example, a logical circular buffer may begin with a first logical link 841 linked to the first buffer element C1 820, which may be linked to subsequent buffer elements 820 at a later time. After the first buffer element C1 820 is allocated, the first buffer element C1 820 may begin to accept data writes. The write router may employ a write pointer 860 to track a current write position within the first buffer element C1 820. For example, after a data write, the write pointer 860 is updated to indicate the last written position or a next position so that a subsequent data write may continue from the last written position. The write pointer 860 may be locally stored at a memory device, such as the memory device 532.

FIG. 8B illustrates an embodiment of a subsequent allocation and buffering scenario. For example, after the first buffer element C1 820 is full, a second buffer element C2 820 is allocated to the logical circular buffer from the storage system. The second buffer element C2 820 is logically positioned after the first buffer element C1 820 and logically linked to the first buffer element C1 820 by a second logical link 842. In addition, the write pointer 860 is advanced (e.g., by the write router) to point to the beginning location of the second buffer element C2 820, which is a current open element in the logical circular buffer ready to accept data write.

FIG. 8C illustrates another embodiment of a subsequent allocation and buffering scenario. For example, after the second buffer element C2 820 is full, a third buffer element C3 820 is allocated for the network storage entity from the storage system. Similarly, the third buffer element C3 820 is logically positioned after the second buffer element C2 820 and logically linked to the second buffer element C2 820 by a third logical link 843. In addition, the write pointer 860 is advanced to point to the beginning location of the third buffer element C3 820, which is a current open element in the network storage entity ready to accept data write.

FIG. 8D illustrates an embodiment of a completed allocation and buffering scenario. For example, after the third buffer element C3 820 is full, a fourth buffer element C4 820 is allocated for the network storage entity from the storage system. Similarly, the fourth buffer element C4 820 is logically positioned after the third buffer element C3 820 and logically linked to the third buffer element C3 820 by a fourth logical link 844. Similarly, the write pointer 860 is advanced to point to a beginning location of the fourth buffer element C4 820, which is a current open element in the network storage entity ready to accept data write. When a sufficient amount of memory is allocated to the logical circular buffer or the network storage entity, for example, based on a data storage specification provided by the tenant, a complete logical circular buffer is formed by logically linking a last allocated buffer element to a buffer element allocated first in time. As shown, the first logical link 841 links the fourth buffer element C4 820 to the first buffer element C1 820.

FIG. 8E illustrates an embodiment of a buffering scenario in a network storage entity comprising a complete logical circular buffer. For example, after the last allocated buffer element, which is the buffer element C4 820, is full, the write pointer 860 is advanced to a next buffer element positioned in the logical circular buffer. As such, the write pointer 860 is rotated back to the first buffer element C1 820 and the data that is previously written into the first buffer element C1 820 may be overwritten with new data. Thus, the data stored in each of the buffer elements 820 comprises a bounded longevity and the size of the logical circular buffer may be computed, for example, by a tenant provisioning system such as the tenant provisioning system 110, based on tenant's storage volume requirements, tenant's data publish and/or write frequency, data formats of the data published by the tenant, and/or the duration of interest for the data.

Figure 9:
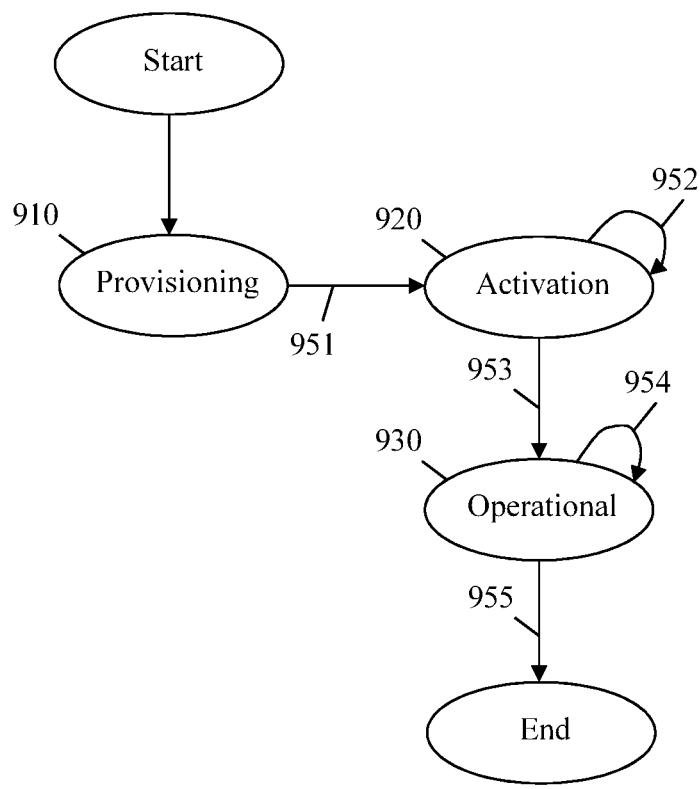
FIG. 9 is a schematic diagram of an embodiment of a data storage process transition diagram.

FIG. 9 is a schematic diagram of an embodiment of a data storage process 900 transition diagram. The data storage process 900 is employed by a storage network, such as the network 100. The data storage process 900 may employ a storage system, such as the storage systems 130, 400, and 700, and similar mechanisms as described in the circular buffering scheme 800. The data storage process 900 may be implemented when provisioning a network storage entity for a tenant, such as the tenant 160. The data storage process 900 describes the interactions between the tenant, a tenant provisioning system, such as the tenant provisioning system 110, and a metadata server, such as the metadata server 120. The data storage process 900 comprises a provisioning state 910, an activation state 920, and an operational state 930. The provisioning state 910 begins when the tenant requests for network data storage. For example, the tenant may provide one or more data storage specifications specifying storage requirements, as discussed more fully below, to the tenant provisioning system. During the provisioning state 910, the tenant provisioning system determines whether there is a sufficient amount of system capacity to provision for the tenant based on the data storage specifications. When there is sufficient amount of system capacity, the tenant provisioning system requests that the metadata server create a network storage entity for the tenant according to the tenant's data storage specifications. After the metadata server allocates a first buffer element, such as the buffer element 620 and 820 and logical storage units 420 and 720, to the network storage entity, the data storage process 900 transitions (shown by the arrow 951) to the activation state 920, in which the tenant may begin to send data records to the network storage entity for storage. For example, the activation state 920 may begin with a logical circular buffer comprising a single buffer elements (e.g., the logical storage units 420 and 720 and buffer elements 620 and 820) similar to the scenario shown in FIG. 8A. During the activation state 920, the tenant's data records may be written to the network storage entity, for example, via write routers, such as the write routers 141, and writers, such as the writers 142, as discussed more fully below. After the first buffer element is full, the metadata server may allocate a second buffer element to the logical circular buffer and continue to build the logical circular buffer by logically linking the second buffer element to the first buffer element. The tenant may continue to send data records to the network storage entity for storage and the metadata server may continue to allocate buffer elements to the logical circular buffer (shown by the arrow 952), for example, similar to the scenarios shown in FIGS. 8B and 8C. The data storage process 900 may continue to operate in the activation state 920 until the storage capacity allocated for the network storage entity reaches the tenant's requirement. When a sufficient amount of storage is allocated to the logical circular buffer, the last allocated buffer element is logically linked to the first allocated buffer element to complete the logical circular buffer, for example, similar to the scenario shown in FIG. 8D, and the data storage process 900 transitions (shown by the arrow 953) to the operational state 930. During the operational state 930, the tenant may continue to send data records (shown by the arrow 954) to the network storage entity for storage, where the data records may be written sequentially into the logical circular buffer. As the writing of the data record rotates around the buffer elements, the oldest data records may be overwritten by the most recent data records, for example, similar to the scenario shown in FIG. 8E. During the life time of the network storage entity, the logical circular buffer may be relocated, as described more fully below. The data storage process 900 terminates when the tenant requests to delete the network storage entity (shown by the arrow 955).

Figure 10:
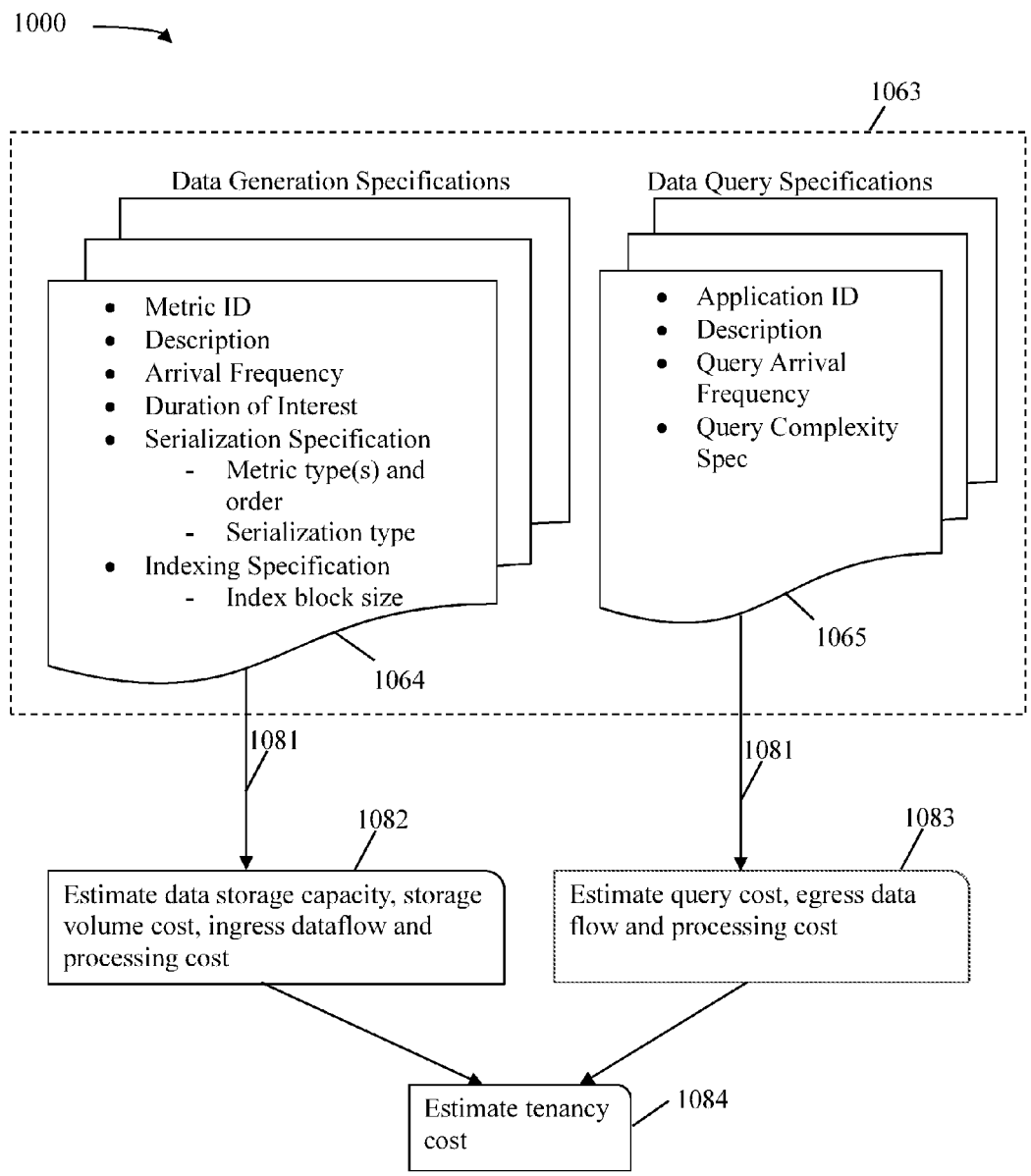
FIG. 10 is a schematic diagram of an embodiment of a multi-tenant storage provision scheme.

FIG. 10 is a schematic diagram of an embodiment of a multi-tenant storage provision scheme 1000. The scheme 1000 is employed by a tenant provisioning system, such as the tenant provisioning system 110, when determining a storage capacity and/or IO performance requirements for a tenant, such as the tenant 160. A tenant may provide one or more data storage specifications 1063 to a tenant provisioning system to request a network storage entity for storing a particular type of data metrics. Some examples of data metrics may include temperatures collected from sensors or video streams collected from a video monitoring system. The scheme 1000 begins at step 1081 when a tenant provides a data storage specification 1063 and a data generation specification 1064 and a data query specification 1065 to the tenant provisioning system. The data generation specification 1064 may include a metric ID that identifies the particular type of data metrics, a description that describes the particular type of data metrics, an arrival frequency or a publishing frequency of the data metrics, a duration of interest for the data metrics, a serialization specification, and/or an indexing specification. The serialization specification may include one or more descriptors for the data metrics. The descriptors may include data types (e.g., integers, structures), serialization order, encoding rules, and/or codes that describe the data metrics. The serialization specification enables the tenant provisioning system to estimate an amount of memory required for storing the data metrics. The indexing specification may include index block size and/or a maximum value and/or a minimum value for categorizing the data metrics. The indexing specification may be employed for searching data during a data query. The data query specification 1065 may include an application ID that identifies a monitoring and/or analytics applications, such as the monitoring and/or analytics application 162, a description of the application, a data query frequency, and/or parameters associated with a data query complexity.

At step 1082, the tenant provisioning system estimates a data storage capacity, a storage volume cost, and an ingress data flow (e.g., write throughout performance) and processing cost for the tenant based on the tenant's data generation specification 1064. At step 1083, the tenant provisioning system estimates a query cost, an egress data flow (e.g., read throughput performance) and processing cost based on the tenant's query specification 1065. At step 1084, the tenant provisioning system computes a tenancy cost for the tenant by combining the estimated storage volume cost, the estimated ingress data flow and processing cost, the estimated query cost, the estimated egress data flow and processing cost. The steps 1081-1084 may be repeated for each tenant.

Figure 11:
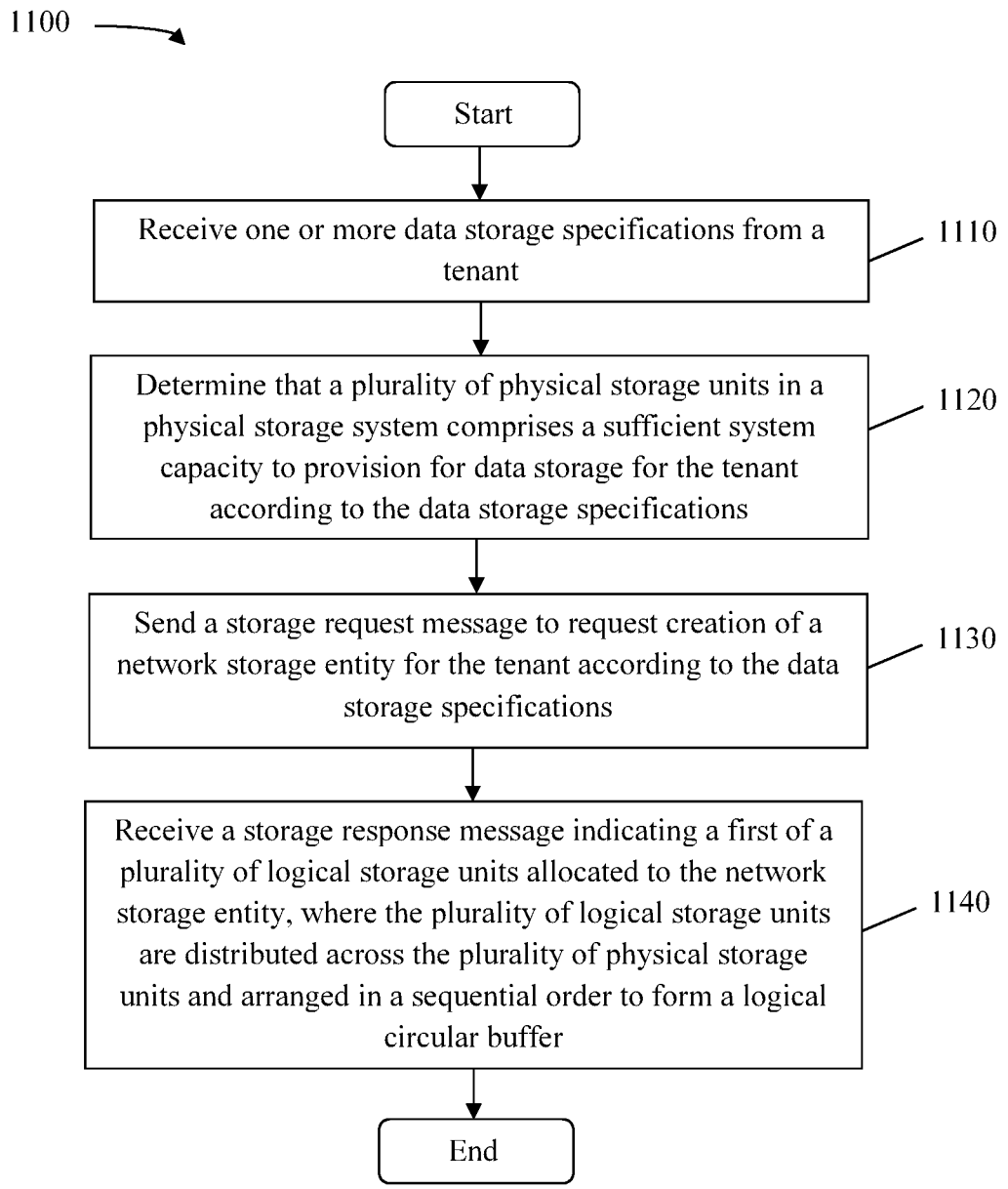
FIG. 11 is a flowchart of an embodiment of a multi-tenant storage provision method.

FIG. 11 is a flowchart of an embodiment of a multi-tenant storage provision method 1100. The method 1100 is implemented by a tenant provisioning system, such as the tenant provisioning system 110, or an NE, such as the NE 500, in a storage network, such as the network 100. The method 1100 is implemented when a tenant, such as the tenant 160, requests for data storage. The method 1100 employs similar mechanisms as described in the scheme 1000. At step 1110, one or more data storage specifications, such as the data generation specification 1064 and the data query specification 1065, are received from a tenant. As described above, the data generation specification may include a data publishing frequency, a duration of interest for the data, a serialization specification associated with a storage format of the data, and an indexing specification associated with a search scheme for the data, or combinations thereof. The data query specification may include a data query frequency and one or more parameters associated with data query complexity. At step 1120, a plurality of physical storage units in a physical storage system is determined to comprise a sufficient system capacity to provision data storage for the tenant according to the data storage specifications. For example, a storage capacity required for the tenant may be determined based on the data publishing frequency, the duration of interest, and/or the serialization specification included in the data generation specification. At step 1130, a storage request message is sent, for example, to a metadata server such as the metadata server 120, to request creation of a network storage entity for the tenant according to the data storage specifications. At step 1140, a storage response message indicating a first of a plurality of logical storage units (e.g., logical storage units 420 and 720 and buffer elements 620 and 820) allocated to the network storage entity is received from the metadata server. The plurality of logical storage units are distributed across the plurality of physical storage units (e.g., the physical storage units 131, 410, and 710) and arranged in a sequential order to form a logical circular buffer (e.g., the logical circular buffer 650). The logical circular buffer provides data storage with a bounded duration. As described above, the buffer elements in the logical circular buffer may be overwritten after some duration of time, where old data may be replaced by new data. Thus, the logical circular buffer provides data storage with a bounded duration. It should be noted that a write throughput requirement, a storage volume cost, and an ingress data flow and processing cost may also be determined from the data generation specification. In addition, a read throughput requirement, a query cost, and an egress data flow and processing cost may be determined from the data query specification.

Figure 12:
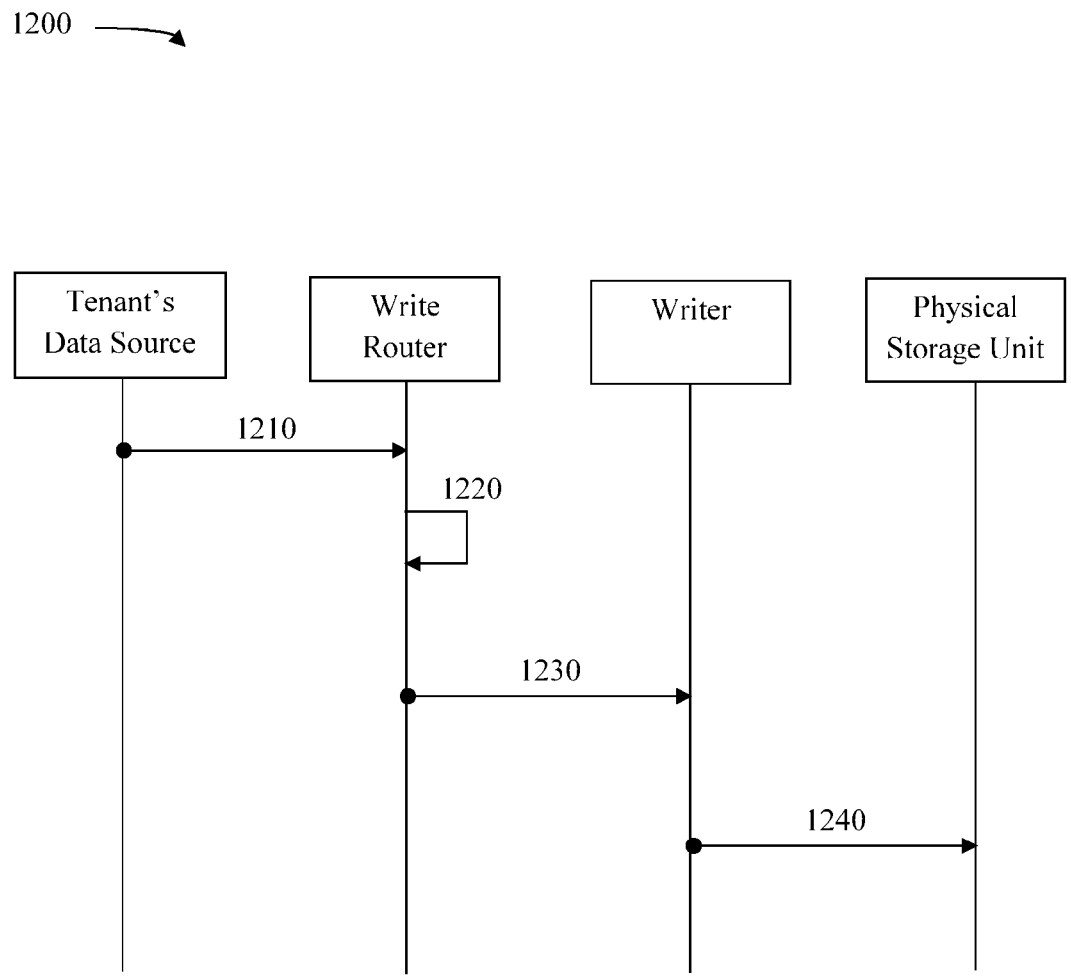
FIG. 12 is a protocol diagram of an embodiment of a storage processing method.

FIG. 12 is a protocol diagram of an embodiment of storage processing method 1200. The method 1200 is implemented between a tenant's data source, such as the tenant's 160 data source 161, a write router, such as the write routers 141, a writer, such as the writers 142, and a physical storage unit, such as the physical storage units 131, 410, and 710, which may be a part of a storage device, such as the storage systems 130, 400, and 700. The method 1200 is implemented after a partial or a full network storage entity is created for the tenant, for example, by employing the scheme 1000 and/or the method 1200. For example, the write router comprises a cached storage record describing the network storage entity. The storage record may include a tenant ID (e.g., Tenant A), a data record ID (e.g., Sensor data A), an association between a logical circular and the network storage entity, an ordered sequence of logical storage units, such as the logical storage units 420 and 720, a logical-to-physical storage map (e.g., addresses of physical storage locations for the logical storage units), a logical storage unit that is opened for storage (e.g., an open element), and a write pointer (e.g., the write pointer 860) that tracks a write position within the open element. At step 1210, the tenant's data source sends a data record to the write router requesting the write router to store the data record to the network storage entity. At step 1220, upon receiving the data record, the write router determines a storage record associated with the tenant's data source. The write router determines a physical storage unit mapped by the open element and a physical location (e.g., a physical address at the physical storage unit) corresponding to the write position indicated by the write pointer. Subsequently, the write router determines a writer that is responsible for writing to the corresponding physical storage unit. At step 1230, the write router routes the data record to the writer and provides the writer with the corresponding physical address. At step 1240, upon receiving the data record and the physical address, the writer stores the data record to the physical storage unit beginning at the physical address. It should be noted that in some embodiments, the writing of the data record to the physical storage unit may include multiple transactions between the writer and the physical storage unit. In addition, the write router may additionally provide the writer with a physical address corresponding to the end of the open element at step 1230 so that the writer may stop writing when the open element is full, as discussed more fully below.

Figure 13:
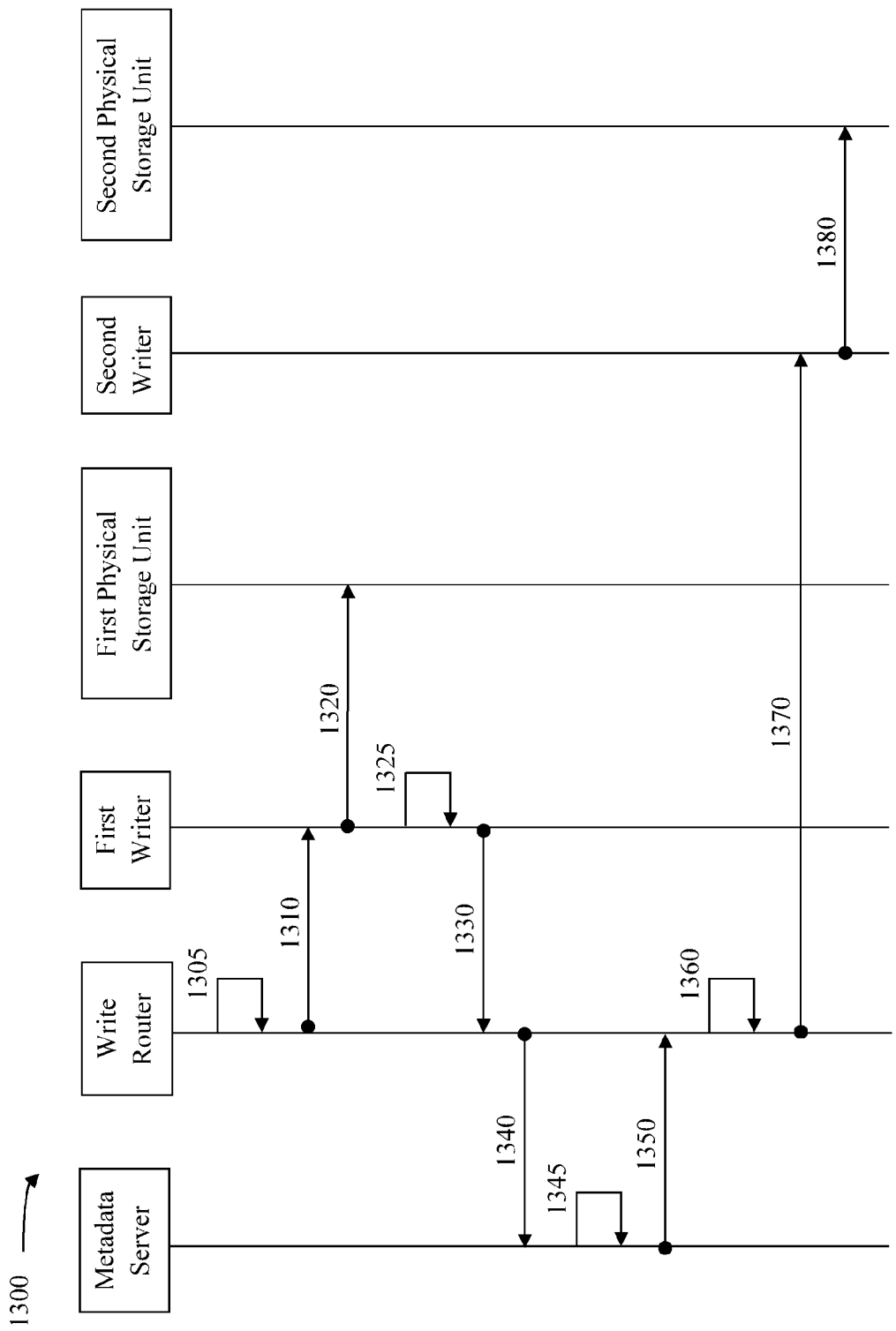
FIG. 13 is a protocol diagram of an embodiment of a storage processing method for a network storage entity comprising an incomplete logical circular buffer.

FIG. 13 is a protocol diagram an embodiment of storage processing method 1300 for a network storage entity comprising an incomplete logical circular buffer. The method 1300 is implemented between a metadata server, such as the metadata server 120, a write router, such as the write routers 141, a first writer and a second writer, such as the writers 142, and a first physical storage unit and a second physical storage unit, such as the physical storage units, 131, 410, and 710. For example, the first physical storage unit and the second physical storage unit are part of one or more storage devices, such as the storage systems 130, 400, and 700, managed by the metadata server. The method 1300 is implemented after a network storage entity is created for a tenant, such as the tenant 160, for example, by employing the scheme 1000 and/or the method 1200, but the building of the network storage entity may still be in progress. As described above, a network storage entity may start with a logical circular buffer comprising a single logical storage unit, such as the logical storage units 420 and 720 and the buffer elements 620 and 820, and subsequent logical storage units may be allocated as data records are received. For example, the write router caches a storage record for a tenant, such as the tenant 160. The storage record may include a tenant ID, a data metric ID, associations between the network storage entity, the logical circular buffer, the logical storage units, the physical storage units, and/or an open element ID that identifies a logical storage unit (e.g., an open element) currently opened for storage. For example, the associations may include a logical-to-physical mapping between the logical storage units and the physical storage units and a sequential relationship between the logical storage units that form the logical circular buffer. In addition, the write router tracks a write position within the open element, which is a last allocated element since the logical circular buffer is incomplete.

At step 1305, the write router determines a first writer for a data record received from a tenant according to the cached storage record based on the write pointer. For example, the write router determines a first physical storage unit mapped by the open element, a first physical location (e.g., a current write address) corresponding to the write position, and a second physical location (e.g., an end address) corresponding to the end of the open element. At step 1310, the write router sends the data record to the first writer and provides the first writer with the current write address and the end address. At step 1320, the first writer begins to write the data record to the first physical storage unit according to the current write address. At step 1325, the first writer determines that a data write reached or will soon reach the end address (e.g., the open element is full). At step 1330, the first writer notifies the write router that the data write reached or will soon reach the end address. At step 1340, the write router sends a request to the metadata server requesting a next logical storage unit for the logical circular buffer. At step 1345, upon receiving the request, the metadata server allocates a next logical storage unit to the logical circular buffer from the storage device and arranges the next logical storage unit subsequent to the last allocated logical storage unit in the logical circular buffer. For example, the metadata server may determine a target physical storage unit (e.g., the second physical storage unit) in the storage device based on one or more objectives, such as capacities, IO throughputs, IO heat or temperature, etc. After determining a target physical storage unit, the metadata server updates a local storage record (e.g., stored in persistent memory) associated with the network storage entity. At step 1350, the metadata server sends a storage record update to the write router to indicate the addition of the next logical storage unit to the logical circular buffer and associated information. In an embodiment, the metadata server may determine that the storage capacity of the network storage entity has reached the requested storage capacity, for example, received from a tenant provisioning system such as the tenant provisioning system 110. Thus, the metadata server may add a final link to complete the logical circular buffer such that the allocated next logical storage unit is subsequent to the last allocated logical storage unit and prior to a logical storage unit allocated first in time. In such an embodiment, the metadata server may additionally indicate an allocation completion in the storage record update message.

At step 1360, upon receiving the storage record update, the write router updates the locally cached storage record according to the received storage record update. Subsequently, the write router determines a second writer that is responsible for writing to the second physical storage unit mapped by the next logical storage unit. At step 1370, the write router sends the data record or a portion of the data record to the second writer, for example, depending on the amount of data written to the first physical storage unit previously at step 1320. At step 1380, the second writer stores the data record to the second physical storage unit. In an embodiment, the last open element and the current open element may be mapped to different portions of the same physical storage unit. In such an embodiment, the first physical storage unit and the second physical storage unit correspond to the same physical storage unit, and the first writer and the second writer correspond to the same writer. In another embodiment, the last open element and the current open element may be mapped to different physical storage units. Thus, the first physical storage unit and the second physical storage unit are different physical storage units, and the first writer and the second writer may be different writers. The method 1300 may continue until a sufficient amount of storage capacity is allocated to the tenant.

Figure 14:
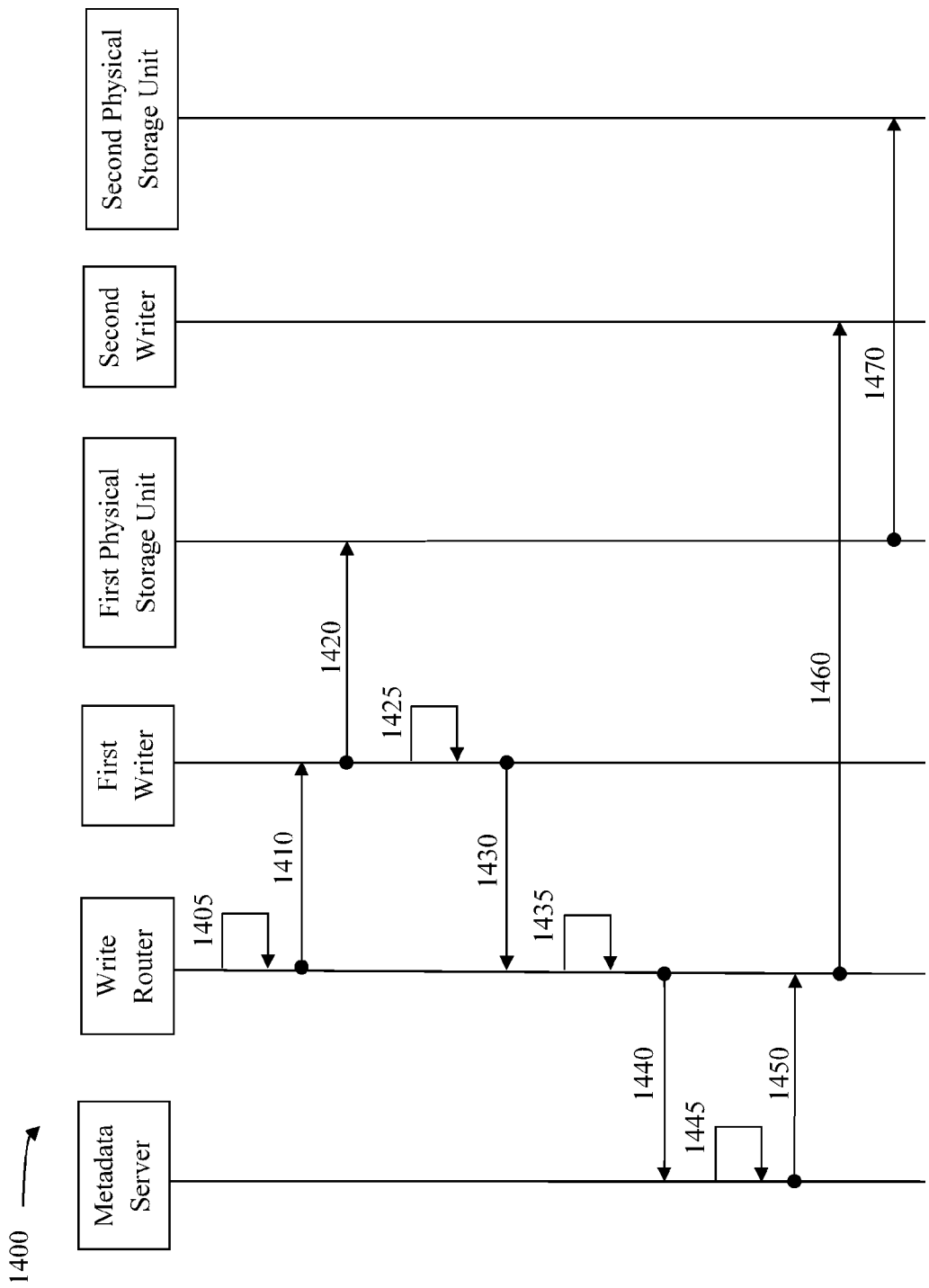
FIG. 14 is a protocol diagram of an embodiment of a storage processing method for a network storage entity comprising a complete logical circular buffer.

FIG. 14 is a protocol diagram an embodiment of storage processing method 1400 for a network storage entity comprising a complete logical circular buffer. The logical circular buffer may be similar to the logical circular buffer 650 and may comprise a plurality of circularly linked buffer elements similar to the buffer elements 620. The method 1400 is implemented between a metadata server, such as the metadata server 120, a write router, such as the write routers 141, a first writer and a second writer, such as the writers 142, a first physical storage unit and a second physical storage unit, such as the physical storage units 131, 410, and 710. For example, the first physical storage unit and the second physical storage unit are part of one or more storage device, such as the storage system 130, managed by the metadata server. The method 1400 is implemented after a network storage entity is completely built for a tenant, such as the tenant 160, for example, by employing similar mechanisms as described in the scheme 1000 and/or the methods 1100, 1200, and 1300. When a network storage entity is completely built, rotations (e.g., replacing oldest data with most recent data) may commence for the buffer elements. For example, the write router caches a storage record associated with the tenant. The storage record may include a tenant ID, a data metric ID, associations between the network storage entity, the logical circular buffer, the logical storage units, the physical storage units, and/or an open element ID that identifies a logical storage unit (e.g., an open element) currently opened for storage. For example, the associations may include a logical-to-physical mapping between the logical storage units and the physical storage units and a sequential relationship between the logical storage units that form the logical circular buffer. In addition, the write router tracks a write position within the open element.

At step 1405, the write router determines a first writer for writing a data record received from the tenant. For example, the write router determines a first physical storage unit mapped by the open element, a first physical location (e.g., a current write address at the physical storage unit) corresponding to the current write position identified by the write pointer, and a second physical location (e.g., an end address) corresponding to the end of the open element according to the cached storage record. At step 1410, the write router sends the data record to the first writer and provides the first writer with the current write address and the end address. At step 1420, the first writer begins to write the data record to the first physical storage unit beginning at the current write address. At step 1425, the writer determines that a data write reaches the end address (e.g., the open element is full). At step 1430, the first writer notifies the write router that the data write has reached the end address. At step 1435, the write router updates the open element identifier to identify a next logical storage unit in the logical circular buffer, determines a second physical storage unit mapped by the next logical storage unit, and selects a second writer associated with the second physical storage unit. At step 1440, the write router sends an update to the metadata server to indicate that the open element is updated to the next logical storage unit. At step 1445, upon receiving the update, the metadata server updates the local storage record (e.g., stored in persistent memory similar to the memory devices 532) associated with the network storage entity. At step 1450, the metadata server sends an acknowledgment to the write router to acknowledge the reception of the update. At step 1460, the write router routes the data record or a portion of the data record to the second writer, for example, depending on the amount of data written to the first physical storage unit previously at step 1420. At step 1470, the second writer stores the data record to the second physical storage unit. Similar to the method 1200, the first and the second physical storage units may be the same physical storage units or different physical storage units, and the first and the second writers may be the same writer or different writers. In some embodiments, the metadata server may additionally relocate the open element to a different physical storage unit at step 1445. In such an embodiment, the metadata server may send relocation information (e.g., logical-to-physical mapping update) to the write router in addition to the acknowledgement at step 1450.

It should be noted that the metadata server stores the storage record in persistent memory, whereas the write router may not store the storage record in persistent memory. Thus, upon a power outage at the writer router, the storage record may not be preserved at the write router. In addition, the write pointer or the current write position is maintained and tracked by the write router without interactions with the metadata server so that the metadata server may operate with a lower throughput, a lower processing speed, and/or a lower IO rate. Thus, by updating the metadata server with the updated open element at step 1440, the metadata server may preserve information associated with the storage record and provide the storage record including the open element identifier to the write router upon a power outage. Subsequently, a current write position may be recovered, for example, by employing a memory checksum method or any other suitable recovery scheme.

Figure 15:
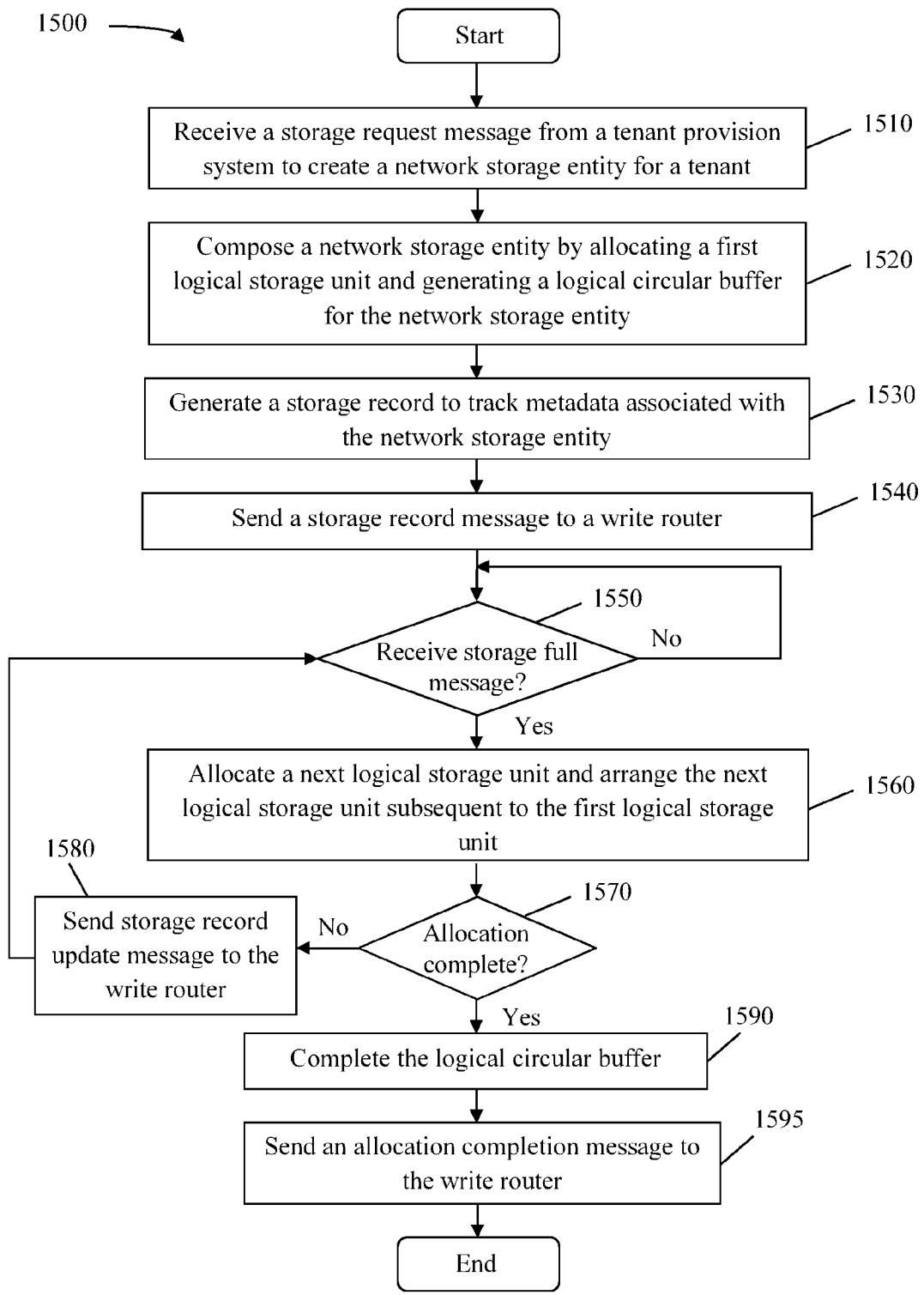
FIG. 15 is a flowchart of an embodiment of a data storage management method.

FIG. 15 is a flowchart of an embodiment of a data storage management method 1500. The method 1500 is implemented by a metadata server, such as the metadata server 120, or an NE, such as the NE 500, in a storage network, such as the network 100. The method 1500 employs similar mechanisms as described in the methods 1100, 1200, 1300, and 1400. The method 1500 begins at step 1510 when a storage request message to create a network storage entity for a tenant, such as the tenant 160, is received from a tenant provisioning system, such as the tenant provisioning system 110. The storage request message may request a fixed storage capacity for the network storage entity. At step 1520, a network storage entity is created for the tenant by allocating a first logical storage unit, such as the logical storage units 420 and 720 and the buffer elements 620 and 820, from a plurality of physical storage units, such as the physical storage units 131, 410, and 710, in a physical storage system, such as the storage systems 130, 400, and 700. For example, the metadata server may select a target physical storage unit based on a storage metric, such as average IO heat. After allocating the first logical storage unit, the metadata server generates a logical circular buffer and associates the first logical storage unit to the logical circular buffer. For example, the logical circular buffer comprises the first logical storage unit and a linkage similar to the scenario shown in FIG. 8A.

At step 1530, a storage record is generated for tracking metadata associated with the network storage entity. The storage record may include a tenant ID, a data metric ID, associations between the network storage entity, the logical circular buffer, the logical storage units, the physical storage units, and/or an open element ID that identifies a logical storage unit (e.g., the first logical storage unit) currently opened for storage. For example, the associations may include a logical-to-physical mapping between the logical storage units and the physical storage units and a sequential relationship between the logical storage units that form the logical circular buffer. At step 1540, a storage record message is sent to a write router, such as the write router 141, to provide the write router with at least some portions of the storage record so that the write router may route data records to the physical storage units according to the storage record. It should be noted that the network storage entity may begin to accept data write once the first logical storage unit is allocated to the network storage entity.

At step 1550, a determination is made whether a storage full message is received from the write router. As described above, a write router may be notified by a writer, such as the writer 142, when an open element is full. If a storage full message is received, the method 1500 proceeds to step 1560. Otherwise, the method 1500 continues to wait for the storage full message at step 1550. At step 1560, a next logical storage unit is allocated to the logical circular buffer. For example, the metadata server may select a target physical storage unit for the next logical storage unit based on some storage metrics, such as average IO heat measures or available capacities of the physical storage units. The next logical storage unit is arranged subsequent to the first logical storage unit in the logical circular buffer, for example, similar to the scenario shown in FIGS. 8B and 8C.

At step 1570, a determination is made whether the network storage entity is completed, for example, by comparing the storage capacity allocated to the network storage entity against the requested storage capacity received at step 1510. If the allocation is not completed, the method 1500 proceeds to step 1580. At step 1580, a storage record update message is sent to the write router. The storage record message may include an ID for the next logical storage unit, a logical-to-physical mapping for the next logical storage unit, and/or association between the next logical storage unit and the previously allocated logical storage unit in the logical circular buffer.

If the allocation is completed, next at step 1590, the logical circular buffer is completed by adding a final link to associate the allocated logical storage unit and a logical storage unit that is allocated first in time for the logical circular buffer. Thus, the allocated next logical storage unit is subsequent to a previously allocated logical storage unit and prior to the first logical storage unit. At step 1595, an allocation completion message is sent to the write router. The allocation completion message may be similar to the storage record update message sent at step 1580, but may additionally indicate allocation completion. It should be noted that the network storage entity may be alternatively built by allocating the full amount of storage capacity prior to updating the write router with the storage record, where data write begins after the logical circular is completely built.

Figure 16:
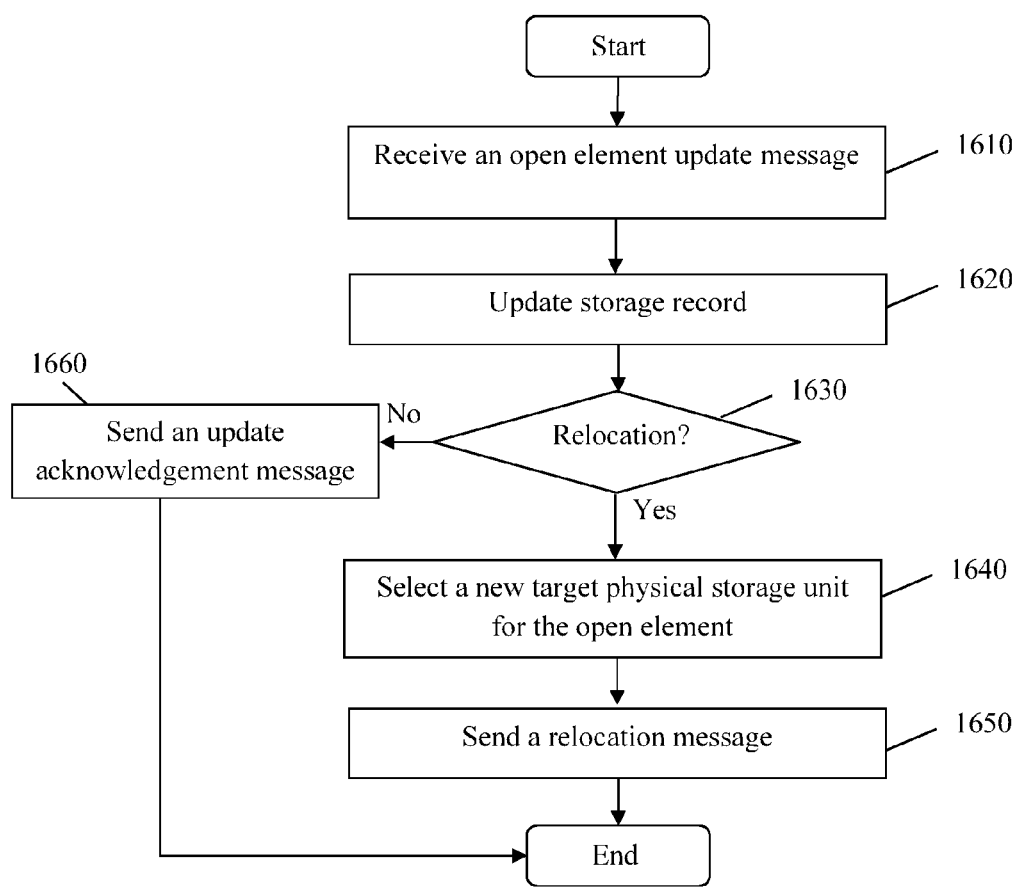
FIG. 16 is a flowchart of another embodiment of a data storage management method.

FIG. 16 is a flowchart of another embodiment of a data storage management method 1600. The method 1600 is implemented by a metadata server, such as the metadata server 120, and an NE, such as the NE 500, in a storage network, such as the network 100. The method 1600 employs similar mechanisms as described in the method 1300. The method 1600 is implemented after a complete network storage entity is built for a tenant, such as the tenant 160. For example, the metadata server may store metadata associated with the network storage entity in a storage record. The storage record may include a sequence of logical storage units, such as the logical storage units 420 and 720 and the buffer elements 620, logically linked to form a logical circular buffer, such as the logical circular buffer 650, a logical-to-physical mapping that maps the logical storage units to physical storage units, such as the physical storage units 131, 410, and 710, and an open element ID that identifies a logical storage unit currently accepting data write. At step 1610, an open element update message is received, for example, from a write router, such as the write router 141. For example, the write router may previously identify a first of the logical storage units as an open element and subsequently the first logical storage unit may be full from data writes. Thus, the write router may update the open element to a second of the logical storage units subsequent to the first logical storage unit in the logical circular buffer.

At step 1620, the storage record may be updated according to the received open element update message, where the open element is updated to the second logical storage unit. At step 1630, a determination is made whether to relocate the open element, which is the second logical storage unit, to a different physical storage unit, for example, based on some storage metrics, such as IO heat. If determining to relocate the open element, next at step 1640, a new target physical storage unit is selected for the open element according to the storage metric. At step 1650, a relocation message is sent to the write router indicating the relocation, which may include an updated logical-to-physical mapping for the second logical storage unit. If determining not to relocate the open element at step 1630, next at step 1660, an update acknowledgement message is sent to the write router indicating the reception of the open element update message. It should be noted that step 1660 may be optional in some implementations. The method 1600 may be repeated during the lifetime of the network storage entity.

Figure 17:
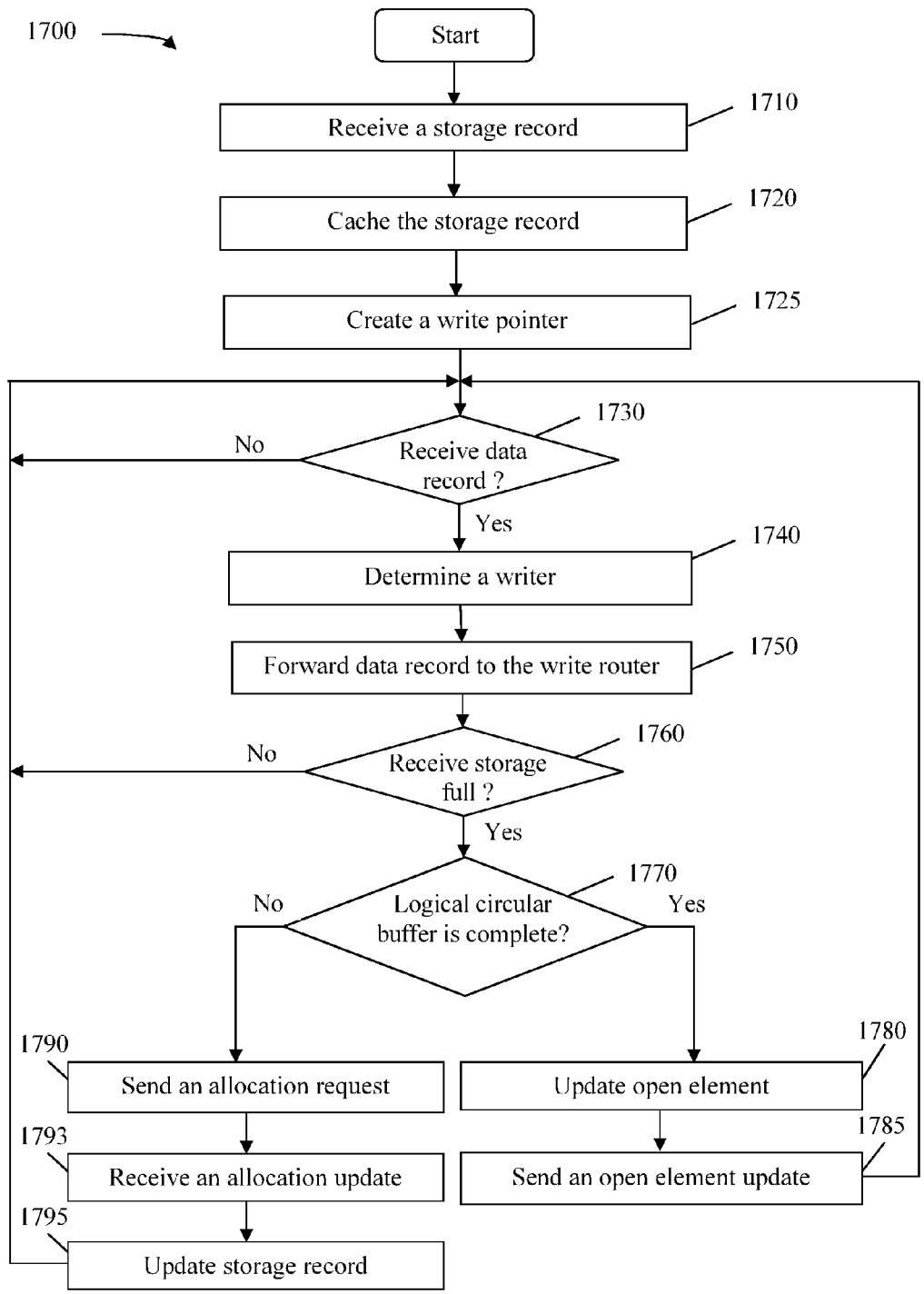
FIG. 17 is a flowchart of an embodiment of a data storage method.

FIG. 17 is a flowchart of an embodiment of a data storage method 1700. The method 1700 is implemented by a write router, such as the write router 141, and an NE, such as the NE 500, in a storage network, such as the network 100. The method 1700 employs similar mechanisms as described in the methods 1200, 1300, and/or 1400. The method 1700 begins at step 1710 when a storage record is received, for example, from a metadata server, such as the metadata server 120. The storage record may include metadata associated with a network storage entity created for a tenant, such as the tenant 160, where the network storage entity corresponds to a logical circular buffer comprising at least a first logical storage unit, such as the logical storage units 420 and 720 and buffer elements 620 and 820, allocated from a plurality of physical storage units, such as the physical storage units 131, 410, and 710, in a storage system, such as the storage systems 130, 400, and 700. Some examples of metadata may include a tenant ID identifying the tenant, a tenant's metric ID identifying the type of data records that may be stored in the network storage entity, an association between the first logical storage unit and the logical circular buffer, a logical-to-physical storage mapping, and an open element ID identifying the first allocated logical storage unit. At step 1720, the storage record is cached locally, for example, in a memory device such as the memory device 532, which may not be persistent. At step 1725, a write pointer is created for tracking a current write position and may be associated with the storage record. The write pointer may also be cached at the memory device. For example, the writer pointer may be set to a starting location of the open element.

At step 1730, a data record is received, for example, from a data source, such as the data source 161, of the tenant. At step 1740, after receiving the data record, a writer, such as the writers 142, is determined for writing the data record. For example, the write router may look up the storage record associated with the tenant and/or the data record and a write pointer associated with the storage record. The write router determines a physical storage unit mapped by the open element and a physical location at the physical storage unit corresponding to the write pointer. At step 1750, the data record is forwarded to the writer. At step 1760, a determination is made whether a storage full indication is received from the writer. If a storage full indication is received from the writer, the method 1700 proceeds to step 1770, otherwise the method 1700 returns to step 1730. At step 1770, a determination is made whether the logical circular buffer is complete. If the logical circular buffer is incomplete, next at step 1790, an allocation request is sent to the metadata server to request for a next logical storage unit. At step 1793, an allocation update is received from the metadata server indicating the allocation in response to the allocation request. For example, the allocation update may indicate the addition of the next logical storage unit to the logical circular buffer and a logical-to-physical mapping for the next logical storage unit. At step 1795, the locally cached storage record is updated according to the allocation update. After updating the local cached storage record, the method 1700 returns to step 1730.

If the logical circular buffer is determined to be complete at step 1770, next at step 1780, the open element is updated to a next logical storage unit in the logical circular buffer. At step 1785, an open element updated is sent to the metadata server to indicate that the open element is updated to the next logical storage unit. The steps 1730-1795 may continue until the network storage entity is deleted.

Figure 18:
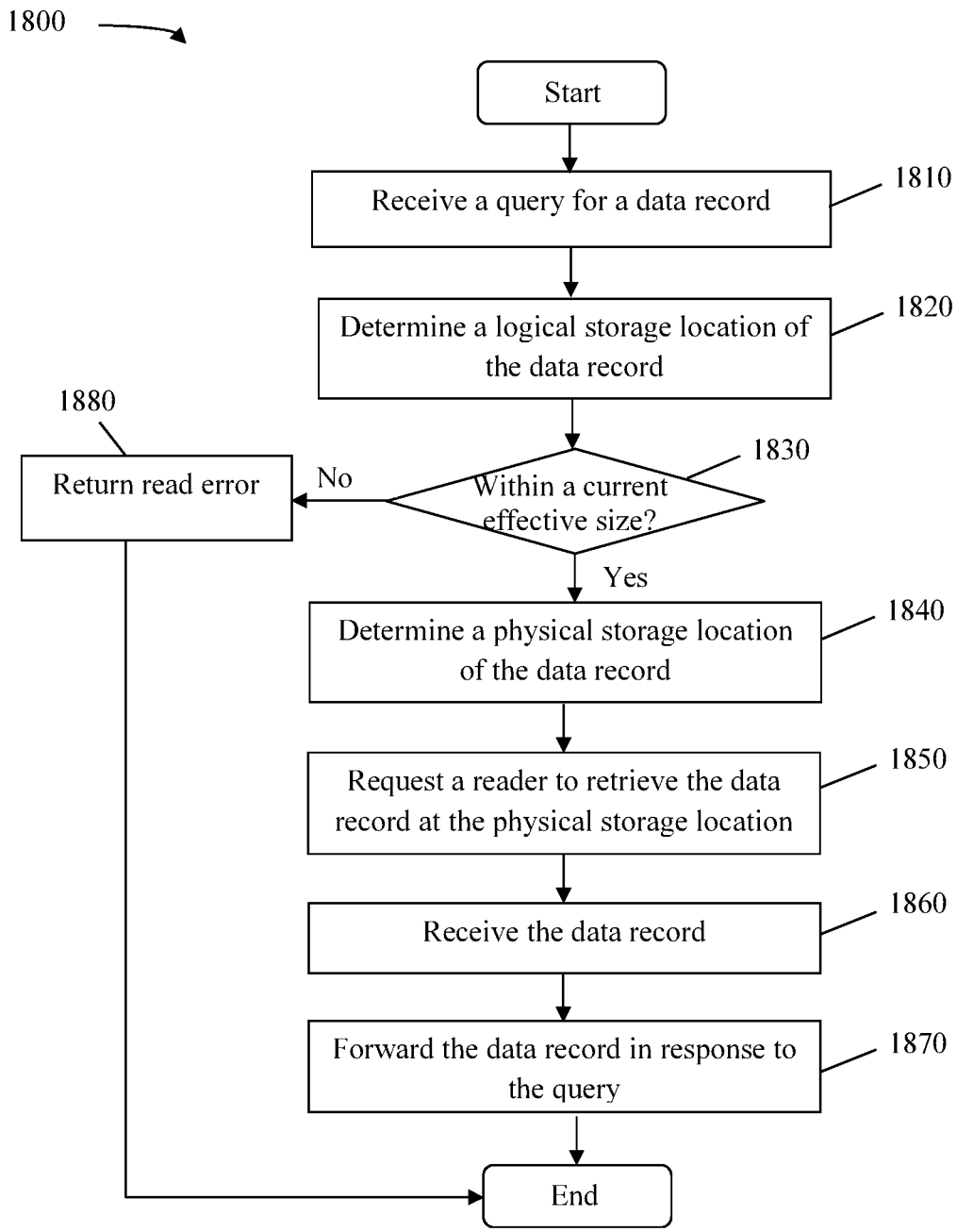
FIG. 18 is a flowchart of an embodiment of a data query method.

FIG. 18 is a flowchart of an embodiment of a data query method 1800. The method 1800 is implemented by a query router, such as the query router 151, and an NE, such as the NE 500, in a storage network, such as the network 100. The method 1800 begins after a network storage entity is created for a tenant, such as the tenant 160, for example, by employing mechanisms as described in the methods 1100, 1200, 1300, 1400, 1500, 1600, and/or 1700. For example, after a metadata server, such as the metadata server 120, creates the network storage entity, the metadata server may send a storage record describing the network storage entity to the query router. The query router may cache the storage record, for example, at a local memory device such as the memory device 532. The storage record may comprise a tenant ID, a metric ID, a logical-to-physical mapping of a plurality of logical storage units that forms a logical circular buffer, such as the circular buffer 650, and/or indexing schemes. At step 1810, a query for a data record is received, for example, from a monitoring application such as the monitoring and/or analytics application 162, of the tenant. At step 1820, the logical storage location of the requested data record is determined. For example, the query router determines a logical storage position for the data record within the logical circular buffer according to the storage record cached at the local memory device. At step 1830, a determination is made whether the logical storage location is within a current effective size of the logical circular buffer. It the logical storage location is not within a current effective size of the logical circular buffer, next at step 1880, a read error is returned in response to the query received at step 1810. Otherwise, the method 1800 proceeds to step 1840. At step 1840, a physical storage location of the requested data record is determined. For example, the query router looks up the physical storage location mapped by the logical storage position according to the logical-to-physical mapping. At step 1850, a request is sent to a reader, such as the reader 152, to retrieve the data record at the physical storage location. As described above, readers are not associated with any particular physical storage units and may access any physical storage units. Thus, the query router may select a reader based on loading or other performance parameters. At step 1860, a data record is received from the reader in response to the request sent at step 1850. At step 1870, the retrieved data record is forwarded in response to the query received at step 1810.

In an embodiment, a data storage service may include a set of system application programming interfaces (APIs). The following table lists the set of APIs:

TABLE 1

A list of data storage service APIs

| APIs | Descriptions |
| --- | --- |
| Create | Create tenant specifications and metadata (e.g., create a logical circular buffer size or a file size) |
| Resize | Increase or reduce the size of the logical circular buffer |
| Delete | Deletes metadata and free physical storages associated with the logical circular buffer |
| Write/PUT | Append data record to a current write position |
| Read/GET | Read data from the logical circular buffer |

The create API is employed by a metadata server, such as the metadata server 120, and a provisioning server, such as the tenant provisioning system 110. The create API creates metadata for a network storage entity based on tenant specifications, such as the data generation specifications 1064 and the data query specifications 1065. For example, a storage capacity (e.g., a logical circular buffer size or file size) may be determined based on data arrival frequency, data serialization specification, and/or duration of interest provided by the tenant specifications.

The resize API is employed by a metadata server and a provisioning server. The resize API may increase or decreases the size of a logical circular buffer. The resizing of a logical circular buffer may not begin until the logical circular buffer is completed or rotation begins. The resizing may be performed over time, for example, based on the duration of interest of the data.

The delete API is employed by a metadata server and a provisioning server. The delete API deletes a metadata associated with a network storage entity and free physical storages mapped by the logical storage units that form the network storage entity.

The write API is employed by writers, such as the writers 142. The write API appends data to a current write position. The current write position corresponds to a logical storage unit, such as the logical storage units 420 and 720, within the logical circular buffer, where the logical storage unit is mapped to a physical storage unit, such as the physical storage units 131, 410, and 710.

The read API is employed by readers, such as the readers 152. The read API may read data at any position within a logical circular buffer. The read API may return a read failure if a read request is not within a current effective size of the logical circular buffer. The data storage service may also provide other APIs, such as portable operating system interface (POSIX)-like operations.

Figure 19:
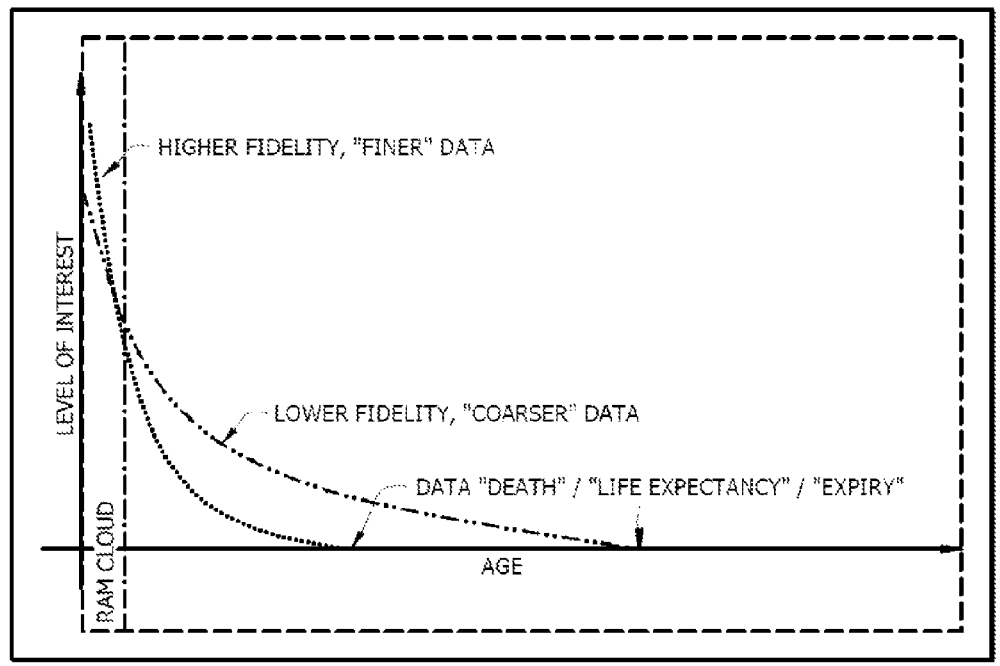
FIG. 19 is a graph of an example user interest in data over time.

FIG. 19 is a graph 1900 of an example user interest in data over time. In graph 1900, level of user interest is depicted in the vertical axis and data age is depicted in the horizontal axis. Interest in high fidelity data (e.g. video) and/or fine grain/high density data drops quickly as data ages. Interest in low fidelity data and/or coarse/low density data drops more slowly. As shown, most data comprises a finite duration of interest or well-bounded life. The storage mechanisms described herein are suitable for storing data with well-bounded life. For example, the employments of a logical circular buffer, such as the logical circular buffer 650, with append-only buffer elements, such as the buffer elements 620 and 820, may allow for sequential data writes and replacement of oldest data with most recent data. It should be noted that the storage capacity or size of a logical circular buffer may be determined based on the duration of interest for the data stored in the logical circular buffer.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
a receiver configured to receive a storage request message requesting creation of a network storage entity for a tenant;
a processor coupled to the receiver and configured to compose the network storage entity according to the storage request message by:
    allocating a plurality of logical storage units mapped to a plurality of physical storage units in a physical storage system according to a storage metric;
    arranging the logical storage units sequentially to form a logical circular buffer; and
    generating a metadata to associate the network storage entity, the logical circular buffer, and the logical storage units, wherein the metadata comprises a mapping between the logical storage units and the physical storage units and a sequential relationship between the logical storage units; and
a transmitter coupled to the processor and configured to send a storage record message comprising at least a portion of the metadata to a network element (NE) instructing the NE to store data associated with the tenant to the network storage entity according to the sequential relationship between the logical storage units and the mapping between the logical storage units and the physical storage units,
wherein the storage request message further requests a first storage capacity for the network storage entity, wherein the receiver is further configured to receive a storage full message from the NE indicating a last allocated logical storage unit is fully written, wherein the processor is further configured to allocate the plurality of logical storage units by:
    determining that the logical circular buffer comprises a second storage capacity that is less than the first storage capacity requested for the network storage entity; and
    allocating a next logical storage unit to the logical circular buffer by selecting a target physical storage unit from the physical storage system according to the storage metric,
wherein the processor is further configured to arrange the logical storage units by arranging the next logical storage unit subsequent to the last allocated logical storage unit in the logical circular buffer, and wherein the transmitter is further configured to send a storage record update message to the NE indicating an addition of a second logical storage unit to the logical circular buffer, wherein the processor is further configured to arrange the logical storage units by:

determining that the logical circular buffer comprises a third storage capacity that is equal to the first storage capacity after allocating the next logical storage unit to the logical circular buffer; and completing the logical circular buffer by arranging the next logical storage unit prior to a logical storage unit allocated first in time in the logical circular buffer.

2. The apparatus of claim 1, wherein the metadata further comprises an open element identifier that identifies a logical storage unit as an open element ready to accept data write.

3. The apparatus of claim 2, further comprising a memory coupled to the processor and configured to store the metadata, wherein the open element identifier identifies a first of the logical storage units as an open element, wherein the receiver is further configured to receive an open element update message from the NE indicating that the open element is updated to a second of the logical storage units subsequent to the first logical storage unit in the logical circular buffer, and wherein the processor is further configured to update the open element identifier in the metadata stored in the memory according to the open element update message.

4. The apparatus of claim 2, wherein the receiver is further configured to receive a storage full message from the NE indicating that a first of the logical storage unit is fully written, wherein the processor is further configured to relocate a second of the logical storage units from a first of the physical storage units to a second of the physical storage units, wherein the second logical storage unit is subsequent to the first logical storage unit in the logical circular buffer, and wherein the transmitter is further configured to send a relocation update message to the NE indicating that the second logical storage unit is relocated to the second physical storage unit.

5. The apparatus of claim 1, further comprising a memory coupled to the processor and configured to store the metadata, wherein the receiver is further configured to receive a recovery request message from the NE requesting to recover the metadata, and wherein the transmitter is further configured to send a storage record recovery message to the NE comprising at least some portions of the metadata stored in the memory in response to the recovery request message.

6. The apparatus of claim 1, wherein the storage metric indicates input/output (IO) heat measures of the physical storage units, available storage capacities of the physical storage units, or combinations thereof.

7. The apparatus of claim 1, wherein the storage request message further requests a first storage capacity for the network storage entity, wherein the receiver is further configured to receive a storage resize message requesting a second storage capacity for the network storage entity, and wherein the processor is further configured to modify logical storage unit allocations for the logical circular buffer according to the storage resize message to provide the second storage capacity.

8. The apparatus of claim 1, wherein the receiver is further configured to receive a storage deletion message requesting to delete the network storage entity, and wherein the processor is further configured to free physical storages associated with the logical storage units in the logical circular buffer.

* * * * *